United States Patent Office 3,652,601
Patented Mar. 28, 1972

3,652,601
ANTHRAQUINONE DYES
Berthold Gertisser, Munchenstein, Basel-Land, Switzerland, assignor to Sandoz Ltd. (also known as Sandoz A.G.), Basel, Switzerland
No Drawing. Filed Feb. 12, 1968, Ser. No. 704,528
Claims priority, application Switzerland, Feb. 20, 1967, 2,436/67; Feb. 21, 1967, 2,497/67; Feb. 23, 1967, 2,797/67; Dec. 21, 1967, 18,016/67; Jan. 18, 1968, 784/68, 785/68, 786/68
Int. Cl. C07c 1/50
U.S. Cl. 260—380
8 Claims

ABSTRACT OF THE DISCLOSURE

Anthraquinone dyes of the formula

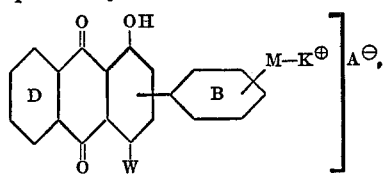

wherein M stands for a divalent radical, W for the nitro group or for an amino group, $K^\oplus$ e.g. for an ammonium-, hydrazinium- or an ammino group, $A^\ominus$ for an anion and wherein the ring B and/or D may be further substituted. They can be used for the dyeing of acrylonitrile polymers or copolymers.

---

This invention relates to a process for the dyeing or printing of textile materials consisting wholly or in part of acrylonitrile polymers or copolymers with dyes of the anthraquinone series having the formula

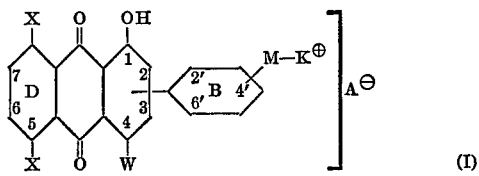

where M stands for a divalent bridge member, one X for a hydroxyl or nitro group or a substituted or unsubstituted amino group, the other X for a hydroxyl group or a substituted or unsubstituted amino group, W for the nitro group or a substituted or unsubstituted amino group, $A^\ominus$ for an anion equivalent to the cation, $K^\oplus$ for a group of the formula

or

and where the rings B and/or D may be further substituted and the group $—M—K]^\oplus$ occupies the position 2' or 4'.

In Formulae II and III, $R_1$ stands for an alkyl or cycloalkyl radical which may be substituted, or together with $R_2$ and the adjacent N atom for a heterocycle, $R_2$ for an alkyl or cycloalkyl radical which may be substituted, or together with $R_1$ and the adjacent N atom for a heterocycle, $R_3$ and $R_4$ for hydrogen or identical or different alkyl or cycloalkyl radicals which may be substituted or for identical or different acyl radicals, and $R_5$, $R_6$ and $R_7$ each stands for hydrogen or an alkyl or cycloalkyl radical which may be substituted; $R_1$ together with $R_3$ and/or $R_2$ together with $R_4$ and the N atoms adjacent to these substituents, and $R_5$ and $R_6$ or $R_5$, $R_6$ and $R_7$ together with the adjacent N atom may form heterocycles.

Particularly good dyeings are obtained using dyes of the formula

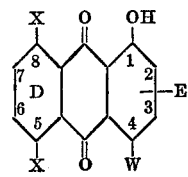

where E represents a radical of the formula

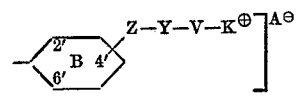

or

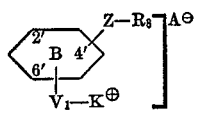

where Z stands for an oxygen or sulphur atom, Y for the direct linkage or for an arylene radical which may be substituted and is bound to V either directly or through a hetero atom or a group of hetero atoms, V for an alkylene radical which may be substituted and may be interrupted by hetero atoms or groups of hetero atoms, $V_1$ for a divalent bridge member bound to $K^\oplus$ through a carbon atom, $R_8$ for a hydrogen atom or a hydrocarbon group, which latter may be substituted, and where the rings B and/or D may be further substituted and the group $$—Z—Y—V—K^\oplus$$

or the group $—Z—R_8$ stands in the position 2' or 4'.

The present invention relates further to:
(1) Basic anthraquinone dyes free from sulphonic acid groups and of the formula

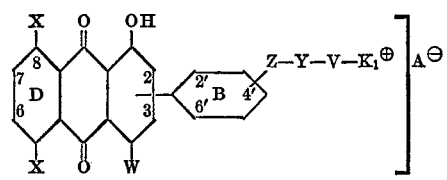

where $K_1$ stands for a group of Formula II or a group of the formula

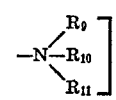

where each of $R_9$, $R_{10}$ and $R_{11}$ each stands for an alkyl or cycloalkyl radical which may be substituted, $R_9$ and $R_{10}$ or $R_9$, $R_{10}$ and $R_{11}$, together with the adjacent N atom, may form a heterocycle, the rings B and/or D may be further substituted, and the group $—Z—Y—V—K_1\oplus]$ stands in position 2' or 4';
(2) Basic anthraquinone dyes free from sulphonic acid groups and of the formula

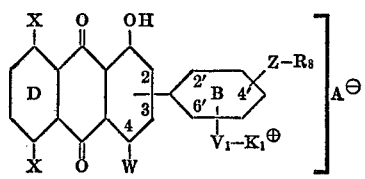

where the —Z—R$_8$ group stands in position 2' or 4';

(3) Anthraquinone dyes free from sulphonic acid groups and of the formula

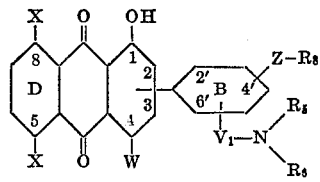

(X)

where the —Z—R$_8$ group stands in position 2' or 4';

(4) Basic anthraquinone dyes free from sulphonic acid groups and of Formula VII, in which at least one of the symbols X and W denotes an alkylamino or arylamino group which may bear further substituents.

The dyes of Formula VII can be produced by means of the following reactions:

(a) The reaction of an anthraquinone compound of the formula

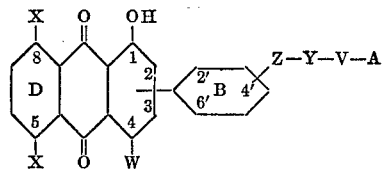

(XI)

where A represents the acid radical of an ester, with a compound of the formula

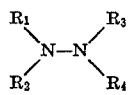

(XII)

or with a compound of the formula

(XIII)

(b) The reaction of an anthraquinone compound of the formula

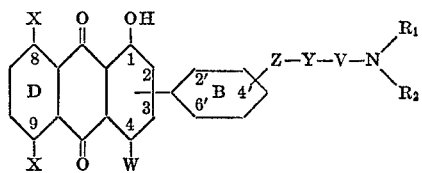

(XIV)

with a compound of the formula

Halogen—NH$_2$  (XV)

or with a compound of the formula

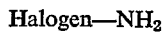

(XVI)

or the conversion of an anthraquinone compound of the formula

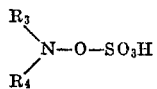

(XVII)

by the action of a quaternating agent into a compound of the formula

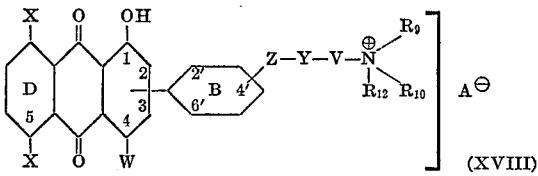

(XVIII)

where R$_{12}$ stands for an alkyl or cycloalkyl radical which may be substituted;

(c) The reaction of boric acid ester of an anthraquinone compound of the formula

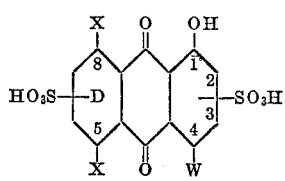

(XIX)

with a compound of the formula

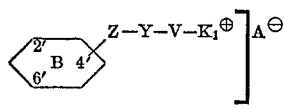

(XX)

to yield a boric acid ester of a compound of the formula

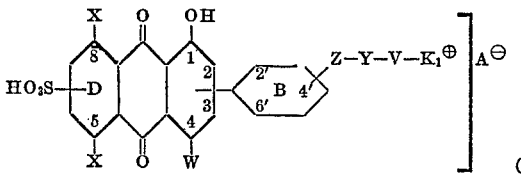

(XXI)

followed by saponification of the boric acid ester group and exchange of the —SO$_3$H— group for a hydrogen atom or a non-water-solubilizing group;

(d) The reaction of a compound of the formula

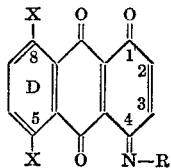

(XXII)

where R stands for hydrogen or a hydrocarbon radical which may be substituted, with a compound of Formula XX;

(e) The reaction of a boric acid ester of a compound of the formula

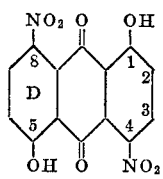

(XXIII)

with a compound of Formula XX, followed by saponification of the boric acid ester group and, where necessary, reduction of the nitro groups to amino groups.

The dyes of Formula IX can be produced by means of the following reactions:

(a) The reaction of an anthraquinone compound of the formula

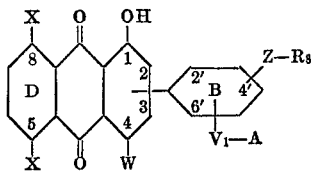

(XXIV)

with a compound of Formula XII or XIII;

(b) The reaction of an anthraquinone compound of the formula

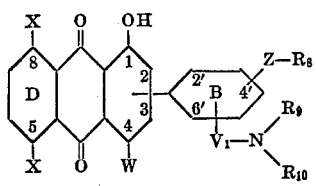

(XXV)

with a compound of Formula XV or XVI, or the conversion of an anthraquinone compound of the formula

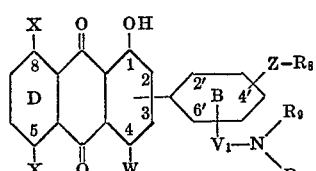

(XXVI)

by means of a quaternating agent into a compound of the formula

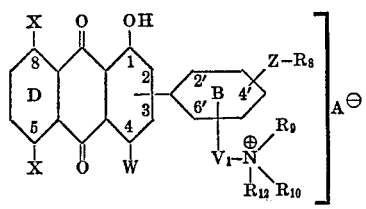

(XXVII)

(c) The reaction of a boric acid ester of an anthraquinone compound of the formula

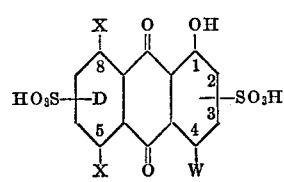

(XIX)

with a compound of the formula

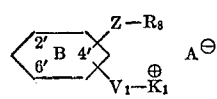

(XXVIII)

to give a boric acid ester of a compound of the formula

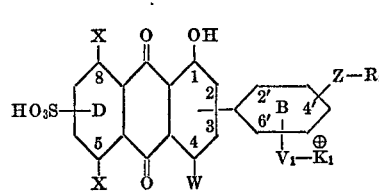

(XXIX)

with subsequent saponification of the boric acid ester group and exchange of the —SO$_3$H— group for a hydrogen atom or a non-water solubilizing group:

(d) The reaction of a compound of Formula XXII with a compound of Formula XXVIII;

(e) The reaction of a boric acid ester of a compound of Formula XXIII with a compound of Formula XXVIII, followed by saponification of the boric acid ester group and, where necessary, reduction of the nitro groups to amino groups.

The dyes of Formula X can be produced by means of the following reactions:

(a) The reaction of an anthraquinone compound of Formula XXIV with a compound of the formula

(XXX)

(b) The reaction of the boric acid ester of a compound of Formula XIX with a compound of the formula

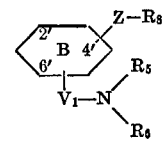

(XXXI)

to give a boric acid ester of a compound of the formula

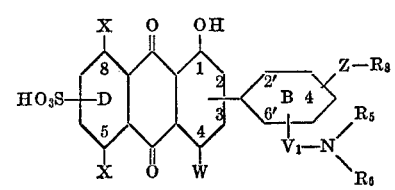

(XXXII)

saponification of the boric acid ester group in the latter compound and exchange of its —SO$_3$H— group for a hydrogen atom or a non-water-solubilizing group;

(c) The reaction of a compound of Formula XXII with a compound of Formula XXXI;

(d) The reaction of a boric ester of a compound of Formula XXIII with a compound of Formula XXXI, saponification of the boric acid ester group in this and, where necessary, reduction of the nitro groups to amino groups.

The dyes of Formula VII, in which at least one of the symbols X and W stands for an alkylamino or arylamino group which may be further substituted, can be obtained by alkylation or arylation of an anthraquinone compound of Formula VII in which at least one of the symbols X or W represents a primary amino group.

Anthraquinone dyes of the formula

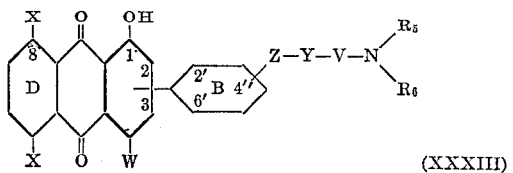

(XXXIII)

can be obtained by reacting a boric ester of an anthraquinone compound of Formula XIX with a compound of the formula

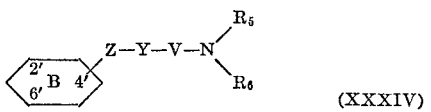

(XXXIV)

to give a boric acid ester of a compound of the formula

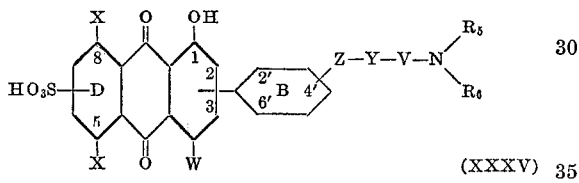

(XXXV)

after which the boric acid group is saponified and the —SO₃H— group exchanged for a hydrogen atom or a non-water solubilizing group.

The radical

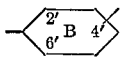

stands preferably in ortho-position to the substituent W, although it may be bound to the hydroxyl group in ortho-position.

Compounds of Formula XI in which A may denote for example halogen, can be prepared as described in French Pat. 1,218,936. Compounds of Formulae XIV and XVII can be prepared as specified in German "Auslegeschrift" No. 1,228,734. Compounds of Formula XXIV, in which A may represent, for example, halogen and R₈ an alkyl radical, can be prepared by reacting the dyes disclosed in French Pat. 1,218,936 with, for example, N-hydroxymethylchloroacetamide.

The anion A⊖ in the compounds of Formulae I, VII and IX may be exchanged for another anion, for example with the aid of an ion exchanger.

In each instance halogen, represents, preferably, chlorine or bromine. One example of an optionally substituted amino group is a group of formula —NH—R, where R may represent hydrogen or a substituted or unsubstituted hydrocarbon radical, e.g. an unsubstituted or substituted alkyl radical having 1 to 12 carbon atoms, such as a methyl, ethyl, propyl or butyl radical; a cycloalkyl radical, such as a cyclohexyl or methylcyclohexyl radical; an aralkyl radical, such as the benzyl radical; or an aryl radical, such as the phenyl or naphthyl radical. If these radicals are substituted they bear, in particular, a hydroxyl group, a halogen atom or the cyano group. The aryl radical may be substituted by alkyl or alkoxy which itself may be substituted. When none of the radicals R₃ to R₇ represents a hydrogen atom and neither R₃ or R₄ is an acyl radical, the radicals R₁ to R₇ and R₉ to R₁₂ represent unsubstituted or substituted alkyl radicals having 1 to 6 or preferably 1 to 4 carbon atoms, such as methyl, ethyl, propyl or butyl radicals, or cycloalkyl radicals, such as the cyclohexyl radical. If these radicals are substituted, they bear preferably a hydroxyl group, a halogen atom or a cyano group. The alkyl radicals may be substituted by an aryl radical, e.g. a phenyl radical, and are then aralkyl radicals, such as the benzyl radical.

The radicals R₁ and R₂ together wth the adjacent N-atom may form a heterocycle, e.g. a pyrrolidine, piperazine, morpholine, aziridine, or piperidine ring. The radical R₁ together with R₃ and/or the radical R₂ together with R₄ and the N-atoms adjacent to these substituents may form a saturated or unsaturated preferably five- or six-membered heterocycle, for example a pyrazolidine, pyridazine or pyrazoline ring, such as trimethylene pyrazolidine or tetramethylene pyrazolidine.

When R₃ or R₄ are acyl radicals, they are preferably of the formula R₁₃—SO₂— or or R₁₄—CO— where R₁₃ represents an aromatic or a saturated or unsaturated aliphatic or cycloaliphatic radical and R₁₄ represents hydrogen or R₁₃. The two acyl radicals together with the adjacent N-atom may form a ring. R₃ or R₄ may be, for example, formyl, acetyl, propionyl, butyroyl, acryloyl, cyanoacetyl, benzoyl, methylsulphonyl, or substituted or unsubstituted phenylsulphonyl.

The radicals R₅ and R₆, and similarly the radicals R₉ and R₁₀, in each case jointly with the adjacent N-atom, may form a heterocycle, for example a pyrrolidine, piperidine, morpholine, aziridine or piperazine ring.

The radicals R₅, R₆ and R₇, or the radicals R₉, R₁₀ and R₁₁ in each case jointly with the adjacent N-atom, may form a pyridine ring or a heterocycle, e.g. a group of the formula

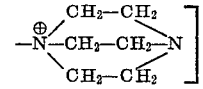

Y may stand preferably for the direct linkage or for a phenylene radical which may be substituted and is bound to V either directly or through a hetero atom or a group of hetero atoms.

V stands for a substituted or unsubstituted, branched or unbranched alkylene radical having 1 to 12 or, preferably, 1 to 4 carbon atoms, which may be interrupted by hetero atoms or groups of hetero atoms.

Examples of hetero atoms or groups of hereto atoms are:

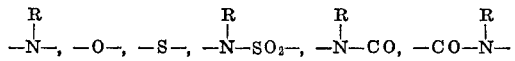

The following are named as examples of bridge members V₁; —(CH₂)ₚ— where p represents a figure from 1 to 6, —CH₂—CH—CH₃, —O—(CH₂)ₚ—,

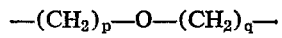

where q represents a figure from 1 to 6,

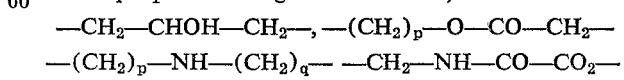

Alkyl generally stands for an alkyl radical having 1 to 6 or preferably 1 to 3 carbon atoms. If the radical R₈ does not stand for a hydrogen atom, it may have the same significance as R.

The rings B and/or D may with advantage be further substituted by non-water-solubilizing substituents. They contain preferably halogen atoms, the hydroxyl group, lower alkyl or alkoxy, hydroxyaryl or alkoxyaryl groups.

The preferred acid radicals A are those of hydrohalic acids; A usually represents Cl or Br. Further examples of acid radicals A are those of sulphuric acid, of a sulphonic acid or of hydrogen sulphite.

The anion A$^\ominus$ may be an organic or inorganic ion, for example the ion of a halogen, such as chloride, bromide or iodide, or of methyl sulphate, sulphate, disulphate, perchlorate, phosphate, phosphotungstic molybdate, benzene sulphonate, naphthalene sulphonate, 4-chlorobenzene sulphonate, oxalate, maleinate, acetate, propionate, methane sulphonate, chloracetate or benzoate, or a complex anion such as that of zinc chloride double salts.

In Belgian Pat. 630,895 an anthraquinone dye of the formula

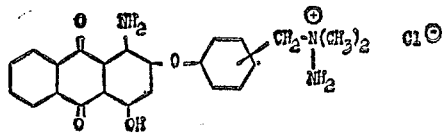

is described and in Belgian Pat. 581,785 one of the formula

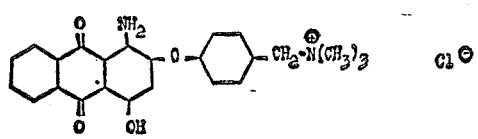

These two dyes are suitable for dyeing acrylic fibres among other materials. It is surprising that the dyes of Formula I have substantially greater power of build-up and higher fastness to light than these dyes on acrylic fibres. The reaction of a compound of Formula XI or XXIV with a compound of Formula XII, XIII or XXX is carried out preferably in an organic solvent at temperatures of —50° to +250° C., or preferably —10° to +120° C. The reaction can be conducted in aqueous medium with addition of an organic solvent if desired, or in the absence of organic solvent at the aforestated temperatures.

The reaction of a compound of Formula XIV or XXV with a halogen amine of Formula XV is carried out preferably in an organic solvent at temperatures of —50° to +80° C. The reaction can also be effected in aqueous medium at the stated temperatures with addition of an organic solvent if desired, in which case the halogen amine can be employed in vapour form or in solution in an organic solvent, in water or in a mixture of organic solvent and water.

The reaction of an amine of Formula XIV or XXV with a hydroxylamine-O-sulphonic acid of Formula XXVI is carried out preferably at —10° to +100° C.

The reaction of an anthraquinone compound of the formula

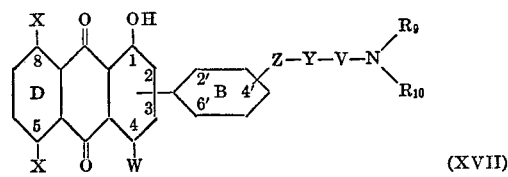

with a quaternating agent to form a compound of the formula

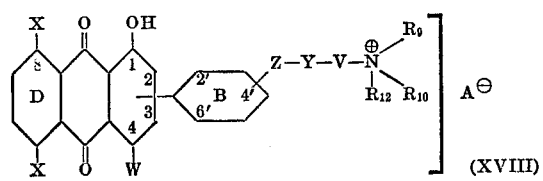

or the reaction of an anthraquinone compound of the formula

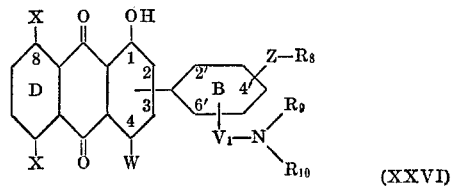

with a quaternating agent to form a compound of the formula

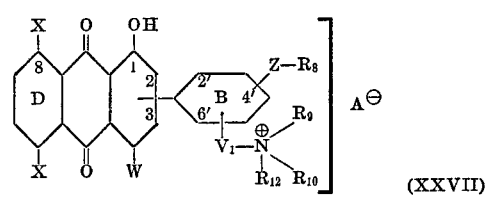

is carried out preferably in an inert solvent or in aqueous suspension or without solvent in an excess of the quaternating agent at elevated temperatures, and if necessary in a buffered medium. Examples of quaternating agents are alkyl halides such as methyl and ethyl chloride, bromide and iodide; alkylsulphates, such as dimethylsulphate; acrylic acid amide/hydrohalide, e.g.

$$CH_2=CH-CO-NH_2/HCl$$

The reaction of an anthraquinone compound of Formula XIX with a compound of Formula XX, XXVII, XXXI or XXXIV to form a boric acid ester of a compound of Formula XXI, XXIV, XXXII or XXXV, the subsequent saponification of the boric acid ester group in these compounds and the exchange of the —SO$_3$H— group for a hydrogen atom or a non-water-solubilizing group is carried out by the known methods, for example as given by J. Houben in "Das Anthracen und die Anthrachinone," 1929, page 449.

The reaction of a compound of Formula XXII with a compound of Formula XX, XXVIII or XXI can likewise be effected by one of the known methods, for example that described in German "Auslesgeschrift" 1,228,734.

The reaction of a compound of Formula XX, XXVIII or XXXI and subsequent saponification of the boric acid ester group and reduction of the groups to amino groups can also be carried out by known methods.

The alkylation of a compound of Formula VII, in which at least one of the symbols X and W stands for an alkyl or arylamine group which may be further substituted, is conducted preferably in an inert solvent or in aqueous suspension or without solvent in an excess of the alkylating or arylating agent at elevated temperatures and, if necessary, in buffered medium. The preferred alkylating agents are epoxides, for example propylene oxide, epichlorohydrin and ethylene oxide. Alternatively, the ordinary alkylating agents can be employed, for example alkyl halides, such as methyl or ethyl chloride, bromide or iodide; alkylsulphates, such as dimethylsulphate; acrylamide; acrylonitrile; and divinyl sulphone. Arylation is carried out advantageously with agents which donate aryl, preferably phenyl, which may be further substituted, for example halogen-aryl compounds, such as halogen benzenes, e.g. bromobenzene.

The new dyes are used for dyeing and printing filaments, fibres and textiles consisting wholly of in part of acrylonitrile polymers or copolymers. They can also be employed for dyeing leather, for the mass coloration of plastics and for the dyeing of paper in the stock.

The dyes are applied preferably from an aqueous neutral or acid medium at the boil or at temperatures above 100° C. with pressure. They give very level dyeings without the assistance of retarders. Very good results are obtained on blend yarns and fabrics containing an acrylic fibre component. Those dyes which have good solubility in organic solvents are suitable for the coloration of plastics, synthetic resins and natural resins. A number of the new dyes can be used for dyeing tannin-treated cotton, regenerated cellulose, synthetic polyamides, leather and paper. It has been found of a great advantage to employ mixtures of two or more of these dyes.

The dyeings obtained have good fastness to light, washing, water, sea water, perspiration, sublimation, cross dyeing, decatizing, pressing, bleaching, dry cleaning and solvents. They are well soluble in water, have good pH-stability and good power of build-up. They are suitable for combination and, in mixture with other basic dyes, give excellent dyeings. In the following examples the parts and percentages are by weight and the temperatures in degree centigrade.

Example 1

4.25 parts of a compound of the formula

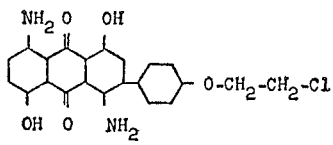

(as disclosed in French Pat. 1,218,936) are dissolved in 20 parts of dimethyl formamide at 60° and 3 parts of asymmetrical dimethyl hydrazine are added dropwise to the solution. The mixture is stirred for 18 hours at 60–65°, after which time 40 parts of chlorobenzene are dropped in at 60–66°. On this addition the dye of the formula

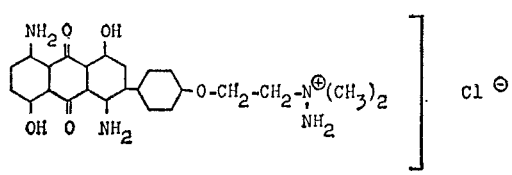

settles out. On drying it is obtained as a crystalline powder of violet colour which dyes acrylic fibres in bright blue shades having very good all-round fastness.

Example 2

4.25 parts of the same starting compound as in Example 1 are entered into 20 parts of pyridine and the resulting mixture is boiled for 12 hours with reflux. After cooling to 60°, 20 parts of chlorobenzene are dropped into the reaction mixture, upon which the dye of the formula

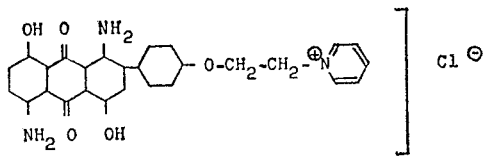

settles out in crystalline form. The dye can be obtained in the pure form by recrystallization from dimethyl formamide. It is a violet powder which gives very fast bright blue dyeings intense depth on acrylic fibres.

Example 3

4.25 parts of the starting compound as used in Example 1 are entered into 22 parts of triethylamine in an autoclave with stirrer. After the addition of 5 parts of dimethyl formamide, the mixture is raised to 120–130° and held at this temperature for 36 hours with constant stirring. Subsequently it is allowed to cool to room temperature and 30 parts of chlorobenzene are dropped into the deep blue suspension, whereupon the dye of the formula

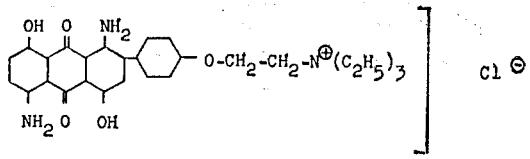

settles out. It can be recrystallized from dimethyl formamide. It is obtained as a violet powder which dyes acrylic fibres in fast bright blue shades.

Example 4

4.3 parts of a compound of the formula

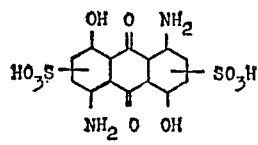

are mixed with 1.9 parts of boric acid; 22 parts of 96% sulphuric acid are added and the mixture is cooled to 20°. At this temperature 2.5 parts of a compound of the formula

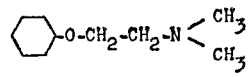

are added with simultaneous cooling of the reaction mixture. The mixture is then stirred for 12 hours at 20° and subsequently discharged into a solution of 11.5 parts of sodium sulphate in 100 parts of water. The first sulpho group of the reaction product is split off by one of the known methods with simultaneous saponification of the boric acid ester group, after which the second SO₃H group is split off. A blue-violet powder is obtained which has the formula

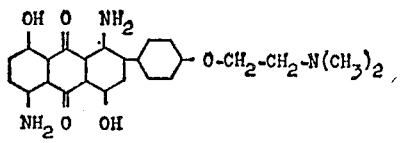

This dye can be applied to acrylic fibres to give deep, bright blue shades.

Example 5

4.33 parts of the compound obtained as given in Example 4 are dissolved in 40 parts of chlorobenzene at the boil. An aqueous solution of 1.38 parts of dimethyl sulphate and 4 parts of chlorobenzene is added dropwise, the mixture stirred for 3½ hours at the boil with reflux, and the reaction product filtered off hot. The filter cake is washed with hot chlorobenzene solution until this runs off colourless. The dye thus obtained has the formula

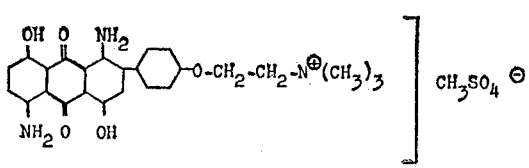

It can be recrystallized from dimethyl formamide. On drying it is obtained as a blue-violet powder which gives bright blue dyeings of good depth and excellent fastness on acrylic fibres.

Example 6

When 4.33 parts of the compound obtained as given in Example 4 are dissolved in 40 parts of nitrobenzene and reacted at 80–100° with methylchloride until the reaction product is no longer precipitated, a dye is obtained which is identical with that of Example 5.

Example 7

4.3 parts of the starting compound used in Example 4 are mixed with 1.9 parts of boric acid. To this mixture is added 22 parts of 96% sulphuric acid. It is then cooled to 20° and at this temperature 3.2 parts of a compound of the formula

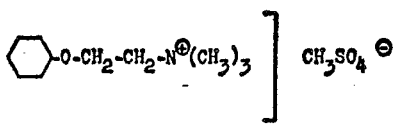

(prepared with dimethylaminoethyl-phenylether quaternated with dimethyl sulphate) are entered. The mixture is stirred for 12 hours at 20° and then discharged into a solution of 11.5 parts of sodium sulphate in 100 parts of water. The reaction product is worked up by the known methods. The dye obtained is identical with that of Example 5.

Example 8a 4.3 parts of the starting compound used in Example 4 are reacted as given in that example with an equivalent amount of a compound of the formula

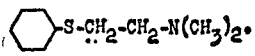

A dye of the formula

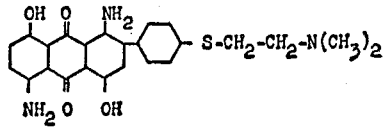

is obtained as a blue-violet powder which dyes acrylic fibres in bright blue shades of good depth with very good fastness properties.

Example 8b

The dye obtained in accordance with Example 8a can be converted by the procedure of Example 5 or 6 into the dye of the formula

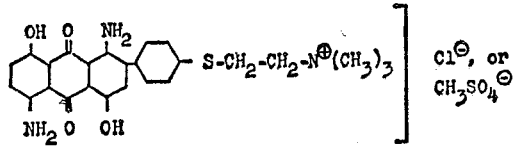

Example 9a 4.33 parts of a compound of the formula

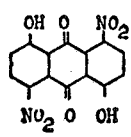

are dissolved in sulphuric acid and boric acid and reacted with a compound of the formula

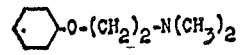

by one of the known methods. The nitro groups of the reaction product are reduced by the known method. A dye is obtained which has the formula

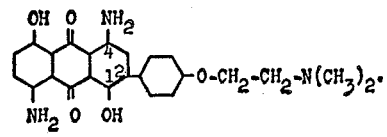

It dyes acrylic fibers in blue shades having good fastness properties.

Example 9b

The dye obtained as described in Example 9a can be converted by the method described in Examples 5 or into a dye of the formula

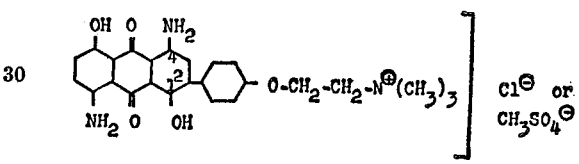

Example 10

15.4 parts of the compound obtained as given in Example 4 and 5.6 parts of sodium hydroxide are suspended with stirring in 40 parts of water at 0–5°, with the subsequent addition of 6.7 parts of hydroxylamino-O-sulphonic acid. The mixture is stirred for a further hour at 0–5° and then cooled slowly to 80° before the reaction product is filtered off. The dye obtained is identical with that of Example 1.

Example 11

15.4 parts of the compound obtained as described in Example 4 are dissolved in dimethyl formamide. A jet of gas consisting of chloramine, ammonia and nitrogen, which can be prepared as described in "Inorganic Synthetics," volume V, page 92, is directed into this solution for 40 minutes at about 30°. Subsequently the reaction solution is evaporated almost to dryness in vacuum. The residue is washed with chlorobenzene until this runs off colourless, then washed with petroleum ether and vacuum dried at 60°. The dye thus obtained is identical with that of Example 1.

Example 11a

When the 2.5 parts of the compound of the formula

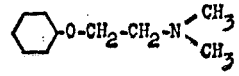

used in Example 4 are replaced by the equivalent amount of a compound of the formula

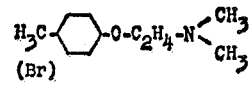

and the procedure of that example is followed, a dye results which has the formula

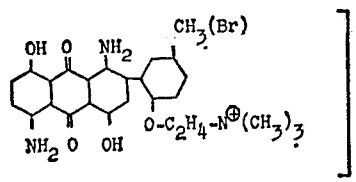

It dyes acrylic fibres in bright blue shades.

Example 11b

The dye obtained as detailed in Example 11a can be converted into the dye of the formula

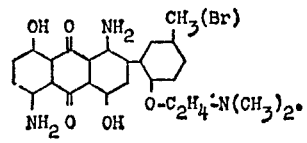

by the methods given in Examples 5 or 6 with dimethylsulphate or methyl chloride. This dye dyes acrylic fibres in bright blue shades.

The structural composition of further dyes which can be produced by the procedures of Examples 1 to 11 is given in the following Table I.

The symbols $K^{\oplus}$, T, Z, W, $X_1$ to $X_6$ in the formula

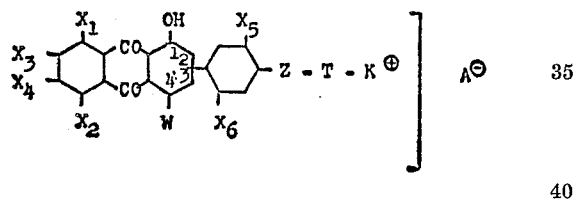

have the meanings given them in the table. The anion may be any one of those named in the specification. The symbol $K^{\oplus}$ may stand for any one of the radicals $K_1$ to $K_{27}$ given in Table A. These groupings may be exchanged for any other of the given groupings in any individual dye.

TABLE A $K^{\oplus}$ can stand for any one of the symbols $K_1$ to $K_{27}$, which represent the following groupings:

| | Represents |
|---|---|
| $K_1$ | $-N(CH_3)_3]^{\oplus}$ |
| $K_2$ | $-N(C_2H_5)_3]^{\oplus}$ |
| $K_3$ | $\begin{array}{c} CH_3 \\ \| \\ -N(C_2H_5)_2 \end{array}]^{\oplus}$ |
| $K_4$ | $\begin{array}{c} C_2H_5 \\ \| \\ -N(CH_3)_2 \end{array}]^{\oplus}$ |
| $K_5$ | $-N(C_2H_4OH)_3]^{\oplus}$ |
| $K_6$ | $\begin{array}{c} CH_3 \\ \| \\ -N(C_2H_4OH)_2 \end{array}]^{\oplus}$ |
| $K_7$ | $\begin{array}{c} CH_3 \\ \| \\ -N-CH_2OH \\ \| \\ C_2H_5 \end{array}]^{\oplus}$ |
| $K_8$ | $\begin{array}{c} C_2H_4-CONH_2 \\ \| \\ -N(CH_3)_2 \end{array}]^{\oplus}$ |

| | |
|---|---|
| $K_9$ | piperazinium ring $]^{\oplus}$ |
| $K_{10}$ | pyridinium $]^{\oplus}$ |
| $K_{11}$ | N-CH$_3$ piperidinium $]^{\oplus}$ |
| $K_{12}$ | N-CH$_3$ pyrrolidinium $]^{\oplus}$ |
| $K_{13}$ | N-CH$_3$ morpholinium $]^{\oplus}$ |
| $K_{14}$ | N-C$_2$H$_4$-CONH$_2$ piperidinium $]^{\oplus}$ |
| $K_{15}$ | N-C$_2$H$_4$-CONH$_2$ morpholinium $]^{\oplus}$ |
| $K_{16}$ | N-C$_2$H$_4$-CONH$_2$ pyrrolidinium $]^{\oplus}$ |
| $K_{17}$ | $\alpha$-picolinium $]^{\oplus}$ |
| $K_{18}$ | quinolinium $]^{\oplus}$ |
| $K_{19}$ | $\begin{array}{c} -N(CH_3)_2 \\ \| \\ NH_2 \end{array}]^{\oplus}$ |
| $K_{20}$ | $\begin{array}{c} -N(C_2H_5)_2 \\ \| \\ NH_2 \end{array}]^{\oplus}$ |
| $K_{21}$ | $\begin{array}{c} -N(C_2H_4OH)_2 \\ \| \\ NH_2 \end{array}]^{\oplus}$ |
| $K_{22}$ | N-NH$_2$ piperidinium $]^{\oplus}$ |
| $K_{23}$ | N-NH$_2$ morpholinium $]^{\oplus}$ |
| $K_{24}$ | N-NH$_2$ pyrrolidinium $]^{\oplus}$ |
| $K_{25}$ | $\begin{array}{c} -N(C_2H_4-CONH_2)_2 \\ \| \\ NH_2 \end{array}]^{\oplus}$ |
| $K_{26}$ | $\begin{array}{c} -N(C_2H_4-CN)_2 \\ \| \\ NH_2 \end{array}]^{\oplus}$ |
| $K_{27}$ | diazabicyclo ring $]^{\oplus}$ |

3,652,601

TABLE I

| Ex. No. | K⊕ | T | Z | W | $X_1$ | $X_2$ | $X_3$ | $X_4$ | $X_5$ | $X_6$ | Shade of dyeing on acrylic fibre |
|---|---|---|---|---|---|---|---|---|---|---|---|
| 12 | $K_2$ | $-C_2H_4-$ | O | $-NH_2$ | $-NH_2$ | $-OH$ | H | H | H | H | Blue. |
| 13 | $K_3$ | $-C_2H_4-$ | O | $-NH_2$ | $-NH_2$ | $-OH$ | H | H | H | H | Do. |
| 14 | $K_4$ | $-C_2H_4-$ | O | $-NH_2$ | $-NH_2$ | $-OH$ | H | H | H | H | Do. |
| 15 | $K_5$ | $-C_2H_4-$ | O | $-NH_2$ | $-NH_2$ | $-OH$ | H | H | H | H | Do. |
| 16 | $K_6$ | $-C_2H_4-$ | O | $-NH_2$ | $-NH_2$ | $-OH$ | H | H | H | H | Do. |
| 17 | $K_7$ | $-C_2H_4-$ | O | $-NH_2$ | $-NH_2$ | $-OH$ | H | H | H | H | Do. |
| 18 | $K_8$ | $-C_2H_4-$ | O | $-NH_2$ | $-NH_2$ | $-OH$ | H | H | H | H | Do. |
| 19 | $K_9$ | $-C_2H_4-$ | O | $-NH_2$ | $-NH_2$ | $-OH$ | H | H | H | H | Do. |
| 20 | $K_{11}$ | $-C_2H_4-$ | O | $-NH-\text{C}_6\text{H}_5$ | $-NH-\text{C}_6\text{H}_5$ | $-OH$ | H | H | H | H | Greenish blue. |
| 21 | $K_{12}$ | $-C_2H_4O$ | O | $NH_2$ | $NH_2$ | $-OH$ | H | H | H | H | Blue. |
| 22 | $K_{13}$ | $-C_2H_4O$ | O | $NH_2$ | $-NH-\text{C}_6\text{H}_5$ | $-OH$ | H | H | H | H | Greenish blue. |
| 23 | $K_{14}$ | $-C_2H_4-$ | O | $NH_2$ | $-NH-\text{C}_6\text{H}_3(\text{CH}_3)_2$ | $-OH$ | H | H | H | H | Do. |
| 24 | $K_{15}$ | $-C_2H_4-$ | O | $NH_2$ | $-NH-\text{C}_6\text{H}_4-\text{OCH}_3$ | $-OH$ | H | H | H | H | Do. |
| 25 | $K_{16}$ | $-C_2H_4-$ | O | $NH_2$ | $-NH_2$ | $-OH$ | H | H | H | H | Blue. |
| 26 | $K_{17}$ | $-C_2H_4-$ | O | $NH_2$ | $-NH_2$ | $-OH$ | H | H | H | H | Do. |
| 27 | $K_{18}$ | $-C_2H_4-$ | O | $NH_2$ | $-NH_2$ | $-OH$ | H | H | H | H | Do. |
| 28 | $K_{20}$ | $-C_2H_4-$ | O | $NH_2$ | $-NH_2$ | $-OH$ | H | H | H | H | Do. |
| 29 | $K_{21}$ | $-C_2H_4-$ | O | $NH_2$ | $-NH_2$ | $-OH$ | H | H | H | H | Do. |
| 30 | $K_{22}$ | $-C_2H_4-$ | O | $NH_2$ | $-NH_2$ | $-OH$ | H | H | H | H | Do. |
| 31 | $K_{23}$ | $-C_2H_4-$ | O | $NH_2$ | $-NH_2$ | $-OH$ | H | H | H | H | Do. |
| 32 | $K_{24}$ | $-C_2H_4-$ | O | $NH_2$ | $-NH_2$ | $-OH$ | H | H | H | H | Do. |
| 33 | $K_{25}$ | $-C_2H_4-$ | O | $NH_2$ | $-NH_2$ | $-OH$ | H | H | H | H | Do. |
| 34 | $K_{26}$ | $-C_2H_4-$ | O | $NH_2$ | $-NH_2$ | $-OH$ | H | H | H | H | Do. |
| 35 | $K_{27}$ | $-C_2H_4-$ | O | $NH_2$ | $-NH_2$ | $-OH$ | H | H | H | H | Do. |
| 36 | $K_1$ | $-C_2H_4-$ | S | $NH_2$ | $-NH_2$ | $-OH$ | H | H | H | H | Do. |
| 37 | $K_2$ | $-C_2H_4-$ | S | $NH_2$ | $-NH_2$ | $-OH$ | H | H | H | H | Do. |
| 38 | $K_3$ | $-C_2H_4-$ | S | $NH_2$ | $-NH_2$ | $-OH$ | H | H | H | H | Do. |
| 39 | $K_4$ | $-C_2H_4-$ | S | $NH_2$ | $-NH_2$ | $-OH$ | H | H | H | H | Do. |
| 40 | $K_9$ | $-C_2H_4-$ | S | $-NH_2$ | $-NH_2$ | $-OH$ | H | H | H | H | Do. |
| 41 | $K_{10}$ | $-C_2H_4-$ | S | $-NH_2$ | $-NH_2$ | $-OH$ | H | H | H | H | Do. |
| 42 | $K_{11}$ | $-C_2H_4-$ | S | $-NH_2$ | $-NH_2$ | $-OH$ | H | H | H | H | Do. |
| 43 | $K_{12}$ | $-C_2H_4-$ | S | $-NH_2$ | $-NH_2$ | $-OH$ | H | H | H | H | Do. |
| 44 | $K_{13}$ | $-C_2H_4-$ | S | $-NH_2$ | $-NH_2$ | $-OH$ | H | H | H | H | Do. |
| 45 | $K_{17}$ | $-C_2H_4-$ | S | $-NH_2$ | $-NH_2$ | $-OH$ | H | H | H | H | Do. |
| 46 | $K_{18}$ | $-C_2H_4O$ | S | $-NH_2$ | $-NH_2$ | $-OH$ | H | H | H | H | Do. |
| 47 | $K_1$ | $-CH_2-CH(CH_3)-$ | O | $-NH_2$ | $-NH_2$ | $-OH$ | H | H | H | H | Do. |
| 48 | $K_2$ | $-CH_2-CH(CH_3)-$ | O | $-NH_2$ | $-NH_2$ | $-OH$ | H | H | H | H | Do. |
| 49 | $K_{10}$ | $-CH_2-CH(CH_3)-$ | O | $-NH_2$ | $-NH_2$ | $-OH$ | H | H | H | H | Do. |
| 50 | $K_{11}$ | $-CH_2-CH(CH_3)-$ | O | $-NH_2$ | $-NH_2$ | $-OH$ | H | H | H | H | Do. |
| 51 | $K_{13}$ | $-CH_2-CH(CH_3)-$ | O | $-NH_2$ | $-NH_2$ | $-OH$ | H | H | H | H | Do. |
| 52 | $K_{17}$ | $-CH_2-CH(CH_3)O-$ | O | $-NH_2$ | $-NH_2$ | $-OH$ | H | H | H | H | Do. |
| 53 | $K_{18}$ | $-CH_2-CH(CH_3)-$ | O | $-NH_2$ | $-NH_2$ | $-OH$ | H | H | H | H | Do. |
| 54 | $K_{19}$ | $-CH_2-CH(CH_3)-$ | O | $-NH_2$ | $-NH_2$ | $-OH$ | H | H | H | H | Do. |
| 55 | $K_{20}$ | $-CH_2-CH(CH_3)-$ | O | $-NH_2$ | $-NH_2$ | $-OH$ | H | H | H | H | Do. |
| 56 | $K_{23}$ | $-CH_2-CH(CH_3)-$ | O | $-NH_2$ | $-NH_2$ | $-OH$ | H | H | H | H | Do. |
| 57 | $K_{24}$ | $-CH_2-CH(CH_3)-$ | O | $-NH_2$ | $-NH_2$ | $-OH$ | H | H | H | H | Do. |
| 58 | $K_1$ | $-CH_2-CH_2-CH_2-$ | O | $-NH_2$ | $-NH_2$ | $-OH$ | H | H | H | H | Do. |
| 59 | $K_{10}$ | $-CH_2-CH_2-CH_2-$ | O | $-NH_2$ | $-NH_2$ | $-OH$ | H | H | H | H | Do. |
| 60 | $K_{19}$ | $-CH_2-CH_2-CH_2-$ | O | $-NH_2$ | $-NH_2$ | $-OH$ | H | H | H | H | Do. |
| 61 | $K_{23}$ | $-CH_2-CH_2-CH_2-$ | O | $-NH_2$ | $-NH_2$ | $-OH$ | H | H | H | H | Do. |
| 62 | $K_1$ | $-C_2H_4-O-C_2H_4-$ | O | $-NH_2$ | $-NH_2$ | $-OH$ | H | H | H | H | Do. |
| 63 | $K_{10}$ | $-C_2H_4-O-C_2H_4-$ | O | $-NH_2$ | $-NH_2$ | $-OH$ | H | H | H | H | Do. |
| 64 | $K_{19}$ | $-C_2H_4-O-C_2H_4-$ | O | $-NH_2$ | $-NH_2$ | $-OH$ | H | H | H | H | Do. |
| 65 | $K_{23}$ | $-C_2H_4-O-C_2H_4-$ | O | $-NH_2$ | $-NH_2$ | $-OH$ | H | H | H | H | Do. |

3,652,601

TABLE I—Continued

| Ex. No. | $K^{\oplus}$ | T | Z | W | $X_1$ | $X_2$ | $X_3$ | $X_4$ | $X_5$ | $X_6$ | Shade of dyeing on acrylic fibre |
|---|---|---|---|---|---|---|---|---|---|---|---|
| 66 | $K_{10}$ | $-C_2H_4-NH-\underset{\underset{O}{\|\|}}{C}-$ | O | $-NH_2$ | $-NH_2$ | $-OH$ | H | H | H | H | Do. |
| 67 | $K_{19}$ | $CH_2-$ | O | $-NH_2$ | $-NH_2$ | $-OH$ | H | H | H | H | Do. |
| 68 | $K_{22}$ | $CH_2-$ | O | $-NH_2$ | $-NH_2$ | $-OH$ | H | H | H | H | Do. |
| 69 | $K_{23}$ | $CH_2-$ | O | $-NH_2$ | $-NH_2$ | $-OH$ | H | H | H | H | Do. |
| 70 | $K_{10}$ | $-C_2H_4-O-\underset{\underset{O}{\|\|}}{C}-CH_2-$ | O | $-NH_2$ | $-NH_2$ | $-OH$ | H | H | H | H | Do. |
| 71 | $K_{19}$ | $-C_2H_4-O-\underset{\underset{O}{\|\|}}{C}-CH_2-$ | O | $-NH_2$ | $-NH_2$ | $-OH$ | H | H | H | H | Do. |
| 72 | $K_{22}$ | $-C_2H_4-O-\underset{\underset{O}{\|\|}}{C}-CH_2-$ | O | $-NH_2$ | $-NH_2$ | $-OH$ | H | H | H | H | Do. |
| 73 | $K_{23}$ | $-C_2H_4-O-\underset{\underset{O}{\|\|}}{C}-CH_2-$ | O | $-NH_2$ | $-NH_2$ | $-OH$ | H | H | H | H | Do. |
| 74 | $K_1$ | $-C_2H_4-$ | O | $-NH_2$ | $-NH_2$ | $-OH$ | H | H | $-CH_3$ | H | Do. |
| 75 | $K_1$ | $-C_2H_4-$ | O | $-NH_2$ | $-NH_2$ | $-OH$ | H | H | H | $-CH_3$ | Do. |
| 76 | $K_{10}$ | $-C_2H_4-$ | O | $-NH_2$ | $-NH_2$ | $-OH$ | H | H | H | $-CH_3$ | Do. |
| 77 | $K_{13}$ | $-CH_2-\underset{\underset{CH_3}{\|}}{CH}-$ | O | $-NH_2$ | $-NH_2$ | $-OH$ | H | H | H | $-CH_3$ | Do. |
| 78 | $K_{19}$ | $-C_2H_4-$ | O | $-NH_2$ | $-NH_2$ | $-OH$ | H | H | $-CH_3$ | $-CH_3$ | Do. |
| 79 | $K_1$ | $-C_2H_4-$ | O | $-NH_2$ | $-NH_2$ | $-OH$ | H | H | H | $-OCH_3$ | Do. |
| 80 | $K_2$ | $-CH_2-\underset{\underset{CH_3}{\|}}{CH}-$ | O | $-NH_2$ | $-NH_2$ | $-OH$ | H | H | $-CH_3$ | $-OCH_3$ | Do. |
| 81 | $K_{10}$ | $-C_2H_4-$ | O | $-NH_2$ | $-NH_2$ | $-OH$ | H | H | H | $-OCH_3$ | Do. |
| 82 | $K_{12}$ | $-C_2H_4-$ | O | $-NH_2$ | $-NH_2$ | $-OH$ | H | H | H | $-OCH_3$ | Do. |
| 83 | $K_{13}$ | $-C_2H_4-$ | O | $-NH_2$ | $-NH_2$ | $-OH$ | H | H | H | $-OCH_3$ | Do. |
| 84 | $K_{19}$ | $-C_2H_4-$ | O | $-NH_2$ | $-NH_2$ | $-OH$ | H | H | H | $-OCH_3$ | Do. |
| 85 | $K_1$ | $-C_2H_4-$ | O | $-NHCH_3$ | $-NH-CH_3$ | $-OH$ | H | H | H | H | Greenish blue. |
| 86 | $K_2$ | $-CH_2-\underset{\underset{CH_3}{\|}}{CH}-$ | O | $-NHCH_3$ | $-NH-CH_3$ | $-OH$ | H | H | H | H | Do. |
| 87 | $K_{10}$ | $-C_2H_4-$ | O | $-NHCH_3$ | $-NH-CH_3$ | $-OH$ | H | H | $-CH_3$ | H | Do. |
| 88 | $K_{11}$ | $-C_2H_4-$ | O | $-NHCH_3$ | $-NH-CH_3$ | $-OH$ | H | H | $-CH_3$ | H | Do. |
| 89 | $K_{13}$ | $-C_2H_4-$ | O | $-NHCH_3$ | $-NH-CH_3$ | $-OH$ | H | H | $-CH_3$ | H | Do. |
| 90 | $K_{18}$ | $-C_2H_4-$ | O | $-NHCH_3$ | $-NH-CH_3$ | $-OH$ | H | H | H | $-OCH_3$ | Do. |
| 91 | $K_{19}$ | $-C_2H_4-$ | O | $-NHCH_3$ | $-NH-CH_3$ | $-OH$ | H | H | H | $-OCH_3$ | Do. |
| 92 | $K_{23}$ | $-C_2H_4-$ | O | $-NH-C_2H_5$ | $-NH-C_2H_5$ | $-OH$ | H | H | H | $-OCH_3$ | Do. |
| 93 | $K_1$ | $-C_2H_4-$ | O | $-NH_2$ | $-NH_2$ | $-OH$ | H | H | Br | H | Blue. |
| 94 | $K_{10}$ | $-C_2H_4-$ | O | $-NH_2$ | $-NH_2$ | $-OH$ | H | H | H | Cl | Do. |
| 95 | $K_{12}$ | $-C_2H_4-$ | O | $-NH_2$ | $-NH_2$ | $-OH$ | H | H | Cl | $-CH_3$ | Do. |
| 96 | $K_{18}$ | $-C_2H_4-$ | O | $-NH_2$ | $-NH_2$ | $-OH$ | H | H | H | Cl | Do. |
| 97 | $K_{19}$ | $-C_2H_4-$ | O | $-NH_2$ | $-NH_2$ | $-OH$ | H | H | Cl | H | Do. |
| 98 | $K_1$ | $-C_2H_4-$ | O | $-NH_2$ | $-NH_2$ | $-OH$ | H | Br | H | H | Do. |
| 99 | $K_2$ | $-CH_2-\underset{\underset{CH_3}{\|}}{CH}-$ | O | $-NH_2$ | $-NH_2$ | $-OH$ | H | Cl | Cl | H | Do. |
| 100 | $K_{10}$ | $-C_2H_4-$ | O | $-NH_2$ | $-NH_2$ | $-OH$ | H | Br | Br | H | Do. |
| 101 | $K_{18}$ | $-C_2H_4-$ | O | $-NH_2$ | $-NH_2$ | $-OH$ | Br | H | Br | H | Do. |
| 102 | $K_{19}$ | $-C_2H_4-$ | O | $-NH_2$ | $-NH_2$ | $-OH$ | Cl | H | H | H | Do. |
| 103 | $K_{23}$ | $-C_2H_4-$ | O | $-NH_2$ | $-NH_2$ | $-OH$ | Br | H | Cl | H | Do. |
| 104 | $K_{24}$ | $-C_2H_4-$ | O | $-NH_2$ | $-NH_2$ | $-OH$ | Br | H | H | H | Do. |
| 105 | $K_1$ | $-C_2H_4-$ | O | $-NH_2$ | $-OH$ | $-OH$ | H | H | H | H | Do. |
| 106 | $K_2$ | $-CH_2-\underset{\underset{CH_3}{\|}}{CH}-$ | O | $-NH_2$ | $-OH$ | $-OH$ | H | H | H | H | Do. |
| 107 | $K_3$ | $-C_2H_4-$ | O | $-NH_2$ | $-OH$ | $-OH$ | Br | H | Br | H | Do. |
| 108 | $K_4$ | $-C_2H_4-$ | O | $-NH_2$ | $-OH$ | $-OH$ | H | H | H | H | Do. |
| 109 | $K_8$ | $-C_2H_4-$ | O | $-NH_2$ | $-OH$ | $-OH$ | H | H | H | H | Do. |
| 110 | $K_9$ | $-C_2H_4-$ | O | $-NH_2$ | $-OH$ | $-OH$ | H | H | H | H | Do. |
| 111 | $K_{10}$ | $-C_2H_4-$ | O | $-NH_2$ | $-OH$ | $-OH$ | H | H | H | H | Do. |
| 112 | $K_{11}$ | $-C_2H_4-$ | O | $-NH_2$ | $-OH$ | $-OH$ | H | H | H | H | Do. |
| 113 | $K_{12}$ | $-C_2H_4-$ | O | $-NH_2$ | $-OH$ | $-OH$ | H | H | H | H | Do. |
| 114 | $K_{53}$ | $-C_2H_4-$ | O | $-NH_2$ | $-OH$ | $-OH$ | H | H | H | H | Do. |
| 115 | $K_{14}$ | $-C_2H_4-$ | O | $-NH_2$ | $-OH$ | $-OH$ | H | H | H | H | Do. |
| 116 | $K_{15}$ | $-C_2H_4-$ | O | $-NH_2$ | $-OH$ | $-OH$ | H | H | H | H | Do. |
| 117 | $K_{16}$ | $-C_2H_4-$ | O | $-NH_2$ | $-OH$ | $-OH$ | H | H | $-CH_3$ | H | Do. |
| 118 | $K_{17}$ | $-C_2H_4-$ | O | $-NH_2$ | $-OH$ | $-OH$ | H | H | H | H | Do. |
| 119 | $K_{18}$ | $-C_2H_4-$ | O | $-NH_2$ | $-OH$ | $-OH$ | H | H | H | H | Do. |
| 120 | $K_{19}$ | $-C_2H_4-$ | O | $-NH_2$ | $-OH$ | $-OH$ | H | H | H | $-CH_3$ | Do. |
| 121 | $K_{20}$ | $-C_2H_4-$ | O | $-NH_2$ | $-OH$ | $-OH$ | H | H | H | H | Do. |
| 122 | $K_{21}$ | $-C_2H_4-$ | O | $-NH_2$ | $-OH$ | $-OH$ | H | H | H | H | Do. |
| 123 | $K_{22}$ | $-C_2H_4-$ | O | $-NH_2$ | $-OH$ | $-OH$ | H | H | H | H | Do. |
| 124 | $K_{23}$ | $-C_2H_4-$ | O | $-NH_2$ | $-OH$ | $-OH$ | H | H | H | H | Do. |
| 125 | $K_{24}$ | $-C_2H_4-$ | O | $-NH_2$ | $-OH$ | $-OH$ | H | H | H | H | Do. |
| 126 | $K_{25}$ | $-C_2H_4-$ | O | $-NH_2$ | $-OH$ | $-OH$ | H | H | H | H | Do. |
| 127 | $K_{26}$ | $-C_2H_4-$ | O | $-NH_2$ | $-OH$ | $-OH$ | H | H | H | H | Do. |
| 128 | $K_{27}$ | $-C_2H_4-$ | O | $-NH_2$ | $-OH$ | $-OH$ | H | H | H | H | Do. |
| 129 | $K_1$ | $-C_2H_4-$ | O | $-NH_2$ | $-OH$ | $-OH$ | H | H | H | H | Do. |
| 130 | $K_2$ | $-C_2H_4-$ | O | $-OH$ | $-NH_2$ | $-NH_2$ | H | H | H | H | Do. |
| 131 | $K_{10}$ | $-C_2H_4-$ | O | $-OH$ | $-NH_2$ | $-NH_2$ | H | H | H | H | Do. |
| 132 | $K_{11}$ | $-C_2H_4-$ | O | $-OH$ | $-NH_2$ | $-NH_2$ | H | H | H | H | Do. |

TABLE I—Continued

| Ex. No. | K⊕ | T | Z | W | $X_1$ | $X_2$ | $X_3$ | $X_4$ | $X_5$ | $X_6$ | Shade of dyeing on acrylic fibre |
|---|---|---|---|---|---|---|---|---|---|---|---|
| 133 | $K_{13}$ | $-C_2H_4-$ | O | —OH | $-NH_2$ | $-NH_2$ | H | H | H | H | Do. |
| 134 | $K_{19}$ | $-C_2H_4-$ | O | —OH | $-NH_2$ | $-NH_2$ | H | H | H | H | Do. |
| 135 | $K_1$ | $-C_2H_4-$ | O | $-NO_2$ | $-NO_2$ | —OH | H | H | H | H | Reddish brown. |
| 136 | $K_2$ | $-C_2H_4-$ | O | $-NH_2$ | $-NO_2$ | —OH | H | H | H | H | Corinth. |
| 137 | $K_{10}$ | $-C_2H_4-$ | O | $-NH_2$ | $-NO_2$ | —OH | H | H | H | H | Do. |
| 138 | $K_{13}$ | $-C_2H_4-$ | O | $-NH_2$ | $-NO_2$ | —OH | H | H | $-CH_3$ | H | Do. |
| 139 | $K_{19}$ | $-C_2H_4-$ | O | $-NH_2$ | $-NO_2$ | —OH | H | H | H | $-CH_3$ | Do. |
| 140 | $K_{23}$ | $-C_2H_4-$ | O | $-NH_2$ | $-NO_2$ | —OH | H | H | H | H | Do. |

Example 141

A compound of the formula

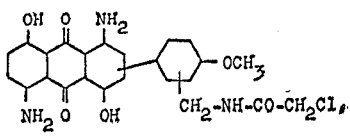

produced by reacting 36.9 parts of a compound of the formula

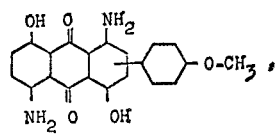

(as disclosed in French Pat. 1,218,936) with 12.4 parts of N-hydroxymethylchloracetamide, is mixed with a solution of dimethylamine and nitrobenzene in a shaking machine and this reaction mixture is shaken for several days. Subsequently it is filtered and the filtrate is concentrated with vacuum. On the addition of methyl alcohol a dye of the formula

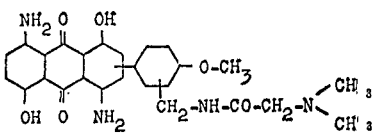

settles out. It dyes acrylic fibres in blue shades with good all-round fastness.

Example 142

12.3 parts of a compound of the formula

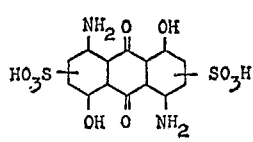

are mixed with 8 parts of boric acid, and 22 parts of sulphuric acid are added to the mixture. It is then cooled to 20° and, at this temperature, 6 parts of N,N-dimethyl-3-methoxy-benzylamine are dropped in. The mixture is stirred for 5 hours. The boric acid ester grouing in the reaction product is saponified and the second —SO₃H— group split off by the known methods. The dye thus obtained has the formula and dyes acrylic fibres in blue shades with good all-around fastness.

Example 143

A solution of 8 parts of N,N-dimethyl-3-methoxy-benzylamine in 90 parts of 96% sulphuric acid is added dropwise at —15° to a solution of 8 parts of a compound of the formula in 130 parts of sulphuric acid. The mixture is stirred for 1 hour at —20 to —25°, after which time the nitro group is reduced and the dye isolated by the known methods. This dye is identical with that of Example 142.

Example 144

A mixture of 4.3 parts of 1,5-dihydroxy-4,8-dinitroanthraquinone and 6.5 parts of boric acid is dissolved at 25–30° in 110 parts of concentrated sulphuric acid and the solution cooled to —5°. At this temperature 3 parts of N,N-dimethyl-3-methoxy-benzylamine are dropped in. The mixture is stirred for 1 hour at this temerature and subsequently the nitro groups are reduced and the dye isolated by the known methods. The dye is identical with that of Example 142.

The dyes listed in the following Table II can be produced by the procedures described for the dyes of Examples 141 to 144. The dyes in the table have the general formula where $X_7$, $X_8$, $V_2$, W, Z, R and F have the meanings given them in Table II and the ring B occupies the positions on the anthraquinone nucleus given in this table. The symbol F may stand for any one of the radicals $F_1$ to $F_{13}$ listed in Table B. These groupings may be exchanged for any other of the given groupings in any individual dye.

TABLE B

F may stand for any one of the symbols $F_1$ to $F_{13}$ which represent the groupings listed hereunder:

| | Represents |
|---|---|
| $F_1$ | $-N(CH_3)_2$ |
| $F_2$ | $-N(C_2H_5)_2$ |
| $F_3$ | $-N(CH_3)(C_2H_5)$ |
| $F_4$ | $-N(CH_3)(C_6H_5)$ |
| $F_5$ | $-NH_2$ |
| $F_6$ | $-NH-CH_3$ |
| $F_7$ | $-NH-C_3H_7$ |
| $F_8$ | morpholino ($-N(CH_2CH_2)_2O$) |
| $F_9$ | pyrrolidino ($-N(CH_2CH_2)_2$) |
| $F_{10}$ | piperidino ($-N(CH_2CH_2)_2CH_2$) |
| $F_{11}$ | $-N(CH_3)(CH_2C_6H_5)$ |
| $F_{12}$ | $-N(CH_3)(C_2H_4OH)$ |
| $F_{13}$ | $-N(C_2H_4OH)_2$ |

TABLE II

| Example No. | F | Position of ring B | $V_2$ | W | $X_7$ | $X_8$ | Z | R | Shade of dyeing on acrylic fibre |
|---|---|---|---|---|---|---|---|---|---|
| 145 | $F_2$ | 3 | $-CH_2-$ | $-NH_2$ | $-NH_2$ | $-OH$ | O | $-CH_3$ | Blue. |
| 146 | $F_2$ | 3 | $-CH_2-$ | $-NH_2$ | $-NH_2$ | $-OH$ | O | $-C_2H_5$ | Do. |
| 147 | $F_3$ | 3 | $-CH_2-$ | $-NH_2$ | $-NH_2$ | $-OH$ | O | $-CH_3$ | Do. |
| 148 | $F_4$ | 3 | $-CH_2-$ | $-NH_2$ | $-NH_2$ | $-OH$ | O | $-CH_3$ | Do. |
| 149 | $F_5$ | 3 | $-CH_2-$ | $-NH_2$ | $-NH_2$ | $-OH$ | O | $-CH_3$ | Do. |
| 150 | $F_6$ | 3 | $-CH_2-$ | $-NH_2$ | $-NH_2$ | $-OH$ | O | $-NH-C_6H_5$ | Do. |
| 151 | $F_7$ | 3 | $-CH_2-$ | $-NH_2$ | $-NH-C_6H_5$ | $-OH$ | O | $-CH_3$ | Greenish blue. |
| 152 | $F_8$ | 3 | $-CH_2-$ | $-NH_2$ | $-NH_2$ | $-OH$ | O | $-CH_3$ | Blue. |
| 153 | $F_9$ | 3 | $-CH_2-$ | $-NH_2$ | $-NH_2$ | $-OH$ | O | $-CH_3$ | Do. |
| 154 | $F_{10}$ | 3 | $-CH_2-$ | $-NH_2$ | $-NH_2$ | $-OH$ | O | $-CH_3$ | Do. |
| 155 | $F_{11}$ | 3 | $-CH_2-$ | $-NH_2$ | $-NH_2$ | $-OH$ | O | $-CH_3$ | Do. |
| 156 | $F_{12}$ | 3 | $-CH_2-$ | $-NH_2$ | $-NH_2$ | $-OH$ | O | $-CH_3$ | Do. |
| 157 | $F_{13}$ | 3 | $-CH_2-$ | $-NH_2$ | $-NH_2$ | $-OH$ | O | $-CH_3$ | Do. |
| 158 | $F_1$ | 2 | $-CH_2-$ | $-NH_2$ | $-NH_2$ | $-OH$ | O | $-CH_3$ | Do. |
| 159 | $F_1$ | 2 | $-CH_2-$ | $-NH_2$ | $-OH$ | $-OH$ | O | $-CH_3$ | Violet. |
| 160 | $F_3$ | 2 | $-CH_2-$ | $-NH_2$ | $-OH$ | $-OH$ | O | $-CH_3$ | Do. |
| 161 | $F_1$ | 3 | $-CH_2-NH-\underset{O}{\overset{\|}{C}}-CH_2-$ | $-NH_2$ | $-NH-CH_2-\underset{OH}{\overset{\|}{CH}}-CH_3$ | $-OH$ | O | $-CH_3$ | Greenish blue. |
| 162 | $F_{10}$ | 3 | $-CH_2-NH-\underset{O}{\overset{\|}{C}}-CH_2-$ | $-NH_2$ | $-NH-CH_2-\underset{OH}{\overset{\|}{CH}}-CH_3$ | $-OH$ | O | $-CH_3$ | Do. |
| 163 | $F_1$ | 3 | $-CH_2-$ | $-NH_2$ | $-C_6H_4-OCH_3$ | $-OH$ | O | $-CH_3$ | Do. |
| 164 | $F_2$ | 3 | $-CH_2-$ | $-NH_2$ | $-C_6H_3(CH_3)_2$ | $-OH$ | O | $-CH_3$ | Do. |
| 165 | $F_3$ | 3 | $-CH_2-$ | $-NH_2$ | $-C_6H_4-O-C_6H_5$ | $-OH$ | O | $-CH_3$ | Do. |
| 166 | $F_1$ | 3 | $-O-CH_2-CH_2-$ | $-NH_2$ | $-NH_2$ | $-OH$ | O | $-CH_3$ | Blue. |
| 167 | $F_1$ | 3 | $-CH_2-O-CH_2-CH_2-$ | $-NH_2$ | $-NH_2$ | $-OH$ | O | $-CH_3$ | Do. |
| 168 | $F_1$ | 3 | $-C_2H_4-$ | $-NH_2$ | $-NH_2$ | $-OH$ | O | $-CH_3$ | Do. |
| 169 | $F_1$ | 3 | $-O-CH_2-\underset{CH_3}{\overset{\|}{CH}}-$ | $-NH_2$ | $-NH_2$ | $-OH$ | O | $-CH_3$ | Do. |
| 170 | $F_1$ | 3 | $-CH_2-HN-\underset{O}{\overset{\|}{C}}-CH_2-$ | $-NH_2$ | $-NH_2$ | $-OH$ | S | $-CH_3$ | Do. |

Example 171

15 parts of the starting compound (a) as used in Example 141 are entered into 60 parts of asymmetrical dimethylhydrazine at 25–30° to form a suspension which is stirred for 18 hours at 25–30°. After elimination of the excess dimethylhydrazine with vacuum, the residue is extracted with nitrobenzene, the mixture filtered and the residue washed with petroleum ether and vacuum dried at 60°. The yield is 15 parts of a dye of the formula

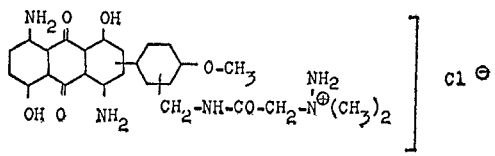

in the form of a violet powder. It dyes acrylic fibres in blue shades with good all-round fastness.

Example 172

A mixture of 10 parts of the chloride of Formula a as used in Example 141 and 40 parts of a 30% ethanolic trimethylamine solution is shaken for 36 hours in a shaking machine. Subsequently the reaction solution is evaporated to dryness, the residue dispersed in nitrobenzene and the dispersion stirred at 80°. The purified dye is then filtered off, washed with toluene and dried at 60° with vacuum.

The resulting dye is of the formula

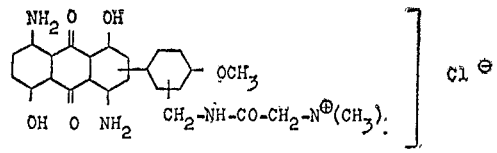

it is a violet powder which dyes acrylic fibres in blue shades with good all-around fastness.

Example 173

10 parts of the compound (b) obtained as detailed in Example 141 and 5 parts of sodium hydroxide are suspended in 400 parts of water at 0–5°. 12 parts of hydroxylamine-O-sulphonic acid are added with stirring, after which the mixture is stirred for one hour at 0–5° and then raised slowly to 80°. The residue is filtered off and dried. On extraction with ethanol a dye is obtained which is identical with that of Example 171, except that with this procedure the $HSO_4^{\ominus}$-group is obtained as anion.

The same dye is formed when 10 parts of compound (b) obtained as given in Example 141 are reacted with chloramine. For this purpose the compound of Formula b is dissolved in dimethyl formamide and a current of gas consisting of chloramine, ammonium and nitrogen is directed into the solution at about 30° for 40 minutes.

A dye identical with that obtained in accordance with Example 172 can be produced by dissolving 10 parts of the compound of Formula b obtained as given in Example 141 in 280 parts of nitrobenzene dropping in 7 parts of dimethylsulphate at this temperature, and stirring the mixture for 2 hours with a simultaneous temperature increase to 120°. The dye settles out and is filtered off, washed with nitrobenzene and toluene, and dried. This procedure gives a dye containing an anion the $CH_3SO_4^{\ominus}$-group.

The dyes detailed in the following Table III can be produced in the same manner as the dyes described in Examples 171 to 173. They are of the general formula

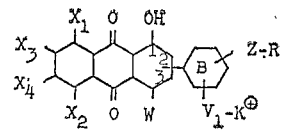

where the symbols $K^{\oplus}$, $V_1$, Z, R, $X_1$ to $X_4$ have the significances given them in Table III and the ring B occupies the position on the anthraquinone nucleus given in the table. The anion $A^{\ominus}$ may be any one of those named in the specification. The symbol $K^{\oplus}$ may stand for any one of the radicals $K_1$ to $K_{27}$ named in Table A on pages 33–35.

TABLE III

| Ex. No. | $K^{\oplus}$ | Position of ring B | $V_1$ | Z | R | W | $X_1$ | $X_2$ | $X_3$ | $X_4$ | Shade of dyeing on acrylic fibre |
|---|---|---|---|---|---|---|---|---|---|---|---|
| 174 | $K_2$ | 3 | —$CH_2$— | O | —$CH_3$ | —$NH_2$ | —$NH_2$ | —OH | H | H | Blue. |
| 175 | $K_3$ | 3 | —$CH_2$ | O | —$C_2H_5$ | —$NH_2$ | —$NH_2$ | —OH | H | H | Do. |
| 176 | $K_4$ | 3 | —$CH_2$ | O | ⬡ | —$NH_2$ | —$NH_2$ | —OH | H | H | Do. |
| 177 | $K_5$ | 3 | —$CH_2$ | O | —$CH_3$ | —$NH_2$ | —$NH_2$ | —OH | H | H | Do. |
| 178 | $K_5$ | 3 | —$CH_2$ | O | —$CH_3$ | —$NH_2$ | —$NH_2$ | —OH | H | H | Do. |
| 179 | $K_6$ | 3 | —$CH_2$ | O | —$CH_3$ | —$NH_2$ | —$NH_2$ | —OH | H | H | Do. |
| 180 | $K_7$ | 3 | —$CH_2$ | O | —$CH_3$ | —$NH_2$ | —$NH_2$ | —OH | H | H | Do. |
| 181 | $K_8$ | 3 | —$CH_2$ | O | —$CH_3$ | —$NH_2$ | —$NH_2$ | —OH | H | H | Do. |
| 182 | $K_9$ | 3 | —$CH_2$ | O | —$CH_3$ | —$NH_2$ | —$NH_2$ | —OH | H | H | Do. |
| 183 | $K_{10}$ | 3 | —$CH_2$ | O | —$CH_3$ | —$NH_2$ | —$NH_2$ | —OH | H | H | Do. |
| 184 | $K_{11}$ | 3 | —$CH_2$ | O | —$CH_3$ | —$NH_2$ | —$NH_2$ | —OH | H | H | Do. |
| 185 | $K_{12}$ | 3 | —$CH_2$ | O | —$CH_3$ | —$NH_2$ | —$NH_2$ | —OH | H | H | Do. |
| 186 | $K_{13}$ | 3 | —$CH_2$ | O | —$CH_3$ | —$NH_2$ | —$NH_2$ | —OH | H | H | Do. |
| 187 | $K_{14}$ | 3 | —$CH_2$ | O | —$CH_3$ | —$NH_2$ | —$NH_2$ | —OH | H | H | Do. |
| 188 | $K_{15}$ | 3 | —$CH_2$ | O | —$CH_3$ | —$NH_2$ | —$NH_2$ | —OH | H | H | Do. |
| 189 | $K_{16}$ | 3 | —$CH_2$ | O | —$CH_3$ | —$NH_2$ | —$NH_2$ | —OH | H | H | Do. |
| 190 | $K_{17}$ | 3 | —$CH_2$ | O | —$CH_3$ | —$NH_2$ | —$NH_2$ | —OH | H | H | Do. |
| 191 | $K_{18}$ | 3 | —$CH_2$ | O | —$CH_3$ | —$NH_2$ | —$NH_2$ | —OH | H | H | Do. |
| 192 | $K_{19}$ | 3 | —$CH_2$ | O | —$CH_3$ | —$NH_2$ | —$NH_2$ | —OH | H | H | Do. |
| 193 | $K_{20}$ | 3 | —$CH_2$ | O | —$CH_3$ | —$NH_2$ | —$NH_2$ | —OH | H | H | Do. |
| 194 | $K_{21}$ | 3 | —$CH_2$ | O | —$CH_3$ | —$NH_2$ | —$NH_2$ | —OH | H | H | Do. |
| 195 | $K_{22}$ | 3 | —$CH_2$ | O | —$CH_3$ | —$NH_2$ | —$NH_2$ | —OH | H | H | Do. |
| 196 | $K_{23}$ | 3 | —$CH_2$ | O | —$CH_3$ | —$NH_2$ | —$NH_2$ | —OH | H | H | Do. |
| 197 | $K_{24}$ | 3 | —$CH_2$ | O | —$CH_3$ | —$NH_2$ | —$NH_2$ | —OH | H | H | Do. |
| 198 | $K_{25}$ | 3 | —$CH_2$ | O | —$CH_3$ | —$NH_2$ | —$NH_2$ | —OH | H | H | Do. |
| 199 | $K_{26}$ | 3 | —$CH_2$ | O | —$CH_3$ | —$NH_2$ | —$NH_2$ | —OH | H | H | Do. |
| 200 | $K_{27}$ | 3 | —$CH_2$ | O | —$CH_3$ | —$NH_2$ | —$NH_2$ | —OH | H | H | Do. |
| 201 | $K_1$ | 3 | —O—$CH_2$—$CH_2$— | O | —$CH_3$ | —$NH_2$ | —$NH_2$ | —OH | H | H | Do. |
| 202 | $K_2$ | 3 | —O—$CH_2$—$CH_2$— | O | —$CH_3$ | —$NH_2$ | —$NH_2$ | —OH | H | H | Do. |
| 203 | $K_{10}$ | 3 | —O—$CH_2$—$CH_2$— | O | —$CH_3$ | —$NH_2$ | —$NH_2$ | —OH | H | H | Do. |
| 204 | $K_{13}$ | 3 | —O—$CH_2$—$CH_2$— | O | —$CH_3$ | —$NH_2$ | —$NH_2$ | —OH | H | H | Do. |
| 205 | $K_{18}$ | 3 | —O—$CH_2$—$CH_2$— | O | —$CH_3$ | —$NH_2$ | —$NH_2$ | —OH | H | H | Do. |
| 206 | $K_{20}$ | 3 | —O—$CH_2$—$CH_2$— | O | $CH_3$ | —$NH_2$ | —$NH_2$ | —OH | H | H | Do. |
| 207 | $K_{23}$ | 3 | —O—$CH_2$—$CH_2$— | O | $CH_3$ | —$NH_2$ | —$NH_2$ | —OH | H | H | Do. |
| 208 | $K_1$ | 3 | —$CH_2$—NH—C(=O)—$CH_2$— | O | $CH_3$ | —$NH_2$ | —$NH_2$ | —OH | H | H | Do. |

TABLE III.—Continued

| Ex. No. | $K^\oplus$ | Position of ring B | $V_1$ | Z | R | W | $X_1$ | $X_2$ | $X_3$ | $X_4$ | Shade of dyeing on acrylic fibre |
|---|---|---|---|---|---|---|---|---|---|---|---|
| 209 | $K_2$ | 3 | $-CH_2-NH-\underset{\underset{O}{\|}}{C}-CH_2-$ | O | $CH_3$ | $-NH_2$ | $-NH_2$ | $-OH$ | H | H | Do. |
| 210 | $K_{10}$ | 3 | $-CH_2-NH-\underset{\underset{O}{\|}}{C}-CH_2-$ | O | $CH_2$ | $-NH_2$ | $-NH_2$ | $-OH$ | H | H | Do. |
| 211 | $K_{12}$ | 3 | $-CH_2-NH-\underset{\underset{O}{\|}}{C}-CH_2-$ | O | $CH_3$ | $-NH_2$ | $-NH_2$ | $-OH$ | H | H | Do. |
| 212 | $K_{20}$ | 3 | $-CH_2-NH-\underset{\underset{O}{\|}}{C}-CH_2-$ | O | $CH_3$ | $-NH_2$ | $-NH_2$ | $-OH$ | H | H | Do. |
| 213 | $K_{24}$ | 3 | $-CH_2-NH-\underset{\underset{O}{\|}}{C}-CH_2-$ | O | $CH_3$ | $-NH_2$ | $-NH_2$ | $-OH$ | H | H | Do. |
| 214 | $K_1$ | 3 | $-CH_2-$ | S | $-C_2H_5$ | $-NH_2$ | $-NH_2$ | $-OH$ | H | H | Do. |
| 215 | $K_2$ | 3 | $-CH_2-$ | S | $-C_2H_5$ | $-NH_2$ | $-NH_2$ | $-OH$ | H | H | Do. |
| 216 | $K_{10}$ | 3 | $-CH_2-$ | S | $-C_2H_5$ | $-NH_2$ | $-NH_2$ | $-OH$ | H | H | Do. |
| 217 | $K_{19}$ | 3 | $-CH_2-$ | S | $-C_2H_5$ | $-NH_2$ | $-NH_2$ | $-OH$ | H | H | Do. |
| 218 | $K_{23}$ | 3 | $-CH_2-$ | S | $-C_2H_5$ | $-NH_2$ | $-NH_2$ | $-OH$ | H | H | Do. |
| 219 | $K_1$ | 3 | $-O-CH_2-\underset{\underset{CH_3}{\|}}{CH}-$ | O | $-CH_3$ | $-NH_2$ | $-NH_2$ | $-OH$ | H | H | Do. |
| 220 | $K_2$ | 3 | $-O-CH_2-\underset{\underset{CH_3}{\|}}{CH}-$ | O | $-CH_3$ | $-NH_2$ | $-NH_2$ | $-OH$ | H | Br | Do. |
| 221 | $K_{10}$ | 3 | $-O-CH_2-\underset{\underset{CH_3}{\|}}{CH}-$ | O | $-CH_3$ | $-NH_2$ | $-NH_2$ | $-OH$ | H | H | Do. |
| 222 | $K_{12}$ | 3 | $-O-CH_2-\underset{\underset{CH_3}{\|}}{CH}-$ | O | $-CH_3$ | $-NH_2$ | $-NH_2$ | $-OH$ | H | H | Do. |
| 223 | $K_{19}$ | 3 | $-O-CH_2-\underset{\underset{CH_3}{\|}}{CH}-$ | O | $-CH_3$ | $-NH_2$ | $-NH_2$ | $-OH$ | H | H | Do. |
| 224 | $K_{23}$ | 3 | $-O-CH_2-\underset{\underset{CH_3}{\|}}{CH}-$ | O | $-CH_3$ | $-NH_2$ | $-NH_2$ | $-OH$ | H | H | Do. |
| 225 | $K_1$ | 2 | $-CH_2-NH-\underset{\underset{O}{\|}}{C}-CH_2-$ | O | $-CH_3$ | $-NH_2$ | $-NH_2$ | $-OH$ | H | H | Do. |
| 226 | $K_{10}$ | 2 | $-CH_2-NH-\underset{\underset{O}{\|}}{C}-CH_2-$ | O | $-CH_3$ | $-NH_2$ | $-NH_2$ | $-OH$ | H | H | Do. |
| 227 | $K_{10}$ | 2 | $-CH_2-NH-\underset{\underset{O}{\|}}{C}-CH_2-$ | O | $-CH_3$ | $-NH_2$ | $-NH_2$ | $-OH$ | H | H | Do. |
| 228 | $K_{23}$ | 2 | $-CH_2-NH-\underset{\underset{O}{\|}}{C}-CH_2-$ | O | $-CH_3$ | $-NH_2$ | $-NH_2$ | $-OH$ | H | H | Do. |
| 229 | $K_1$ | 3 | $-O-CH_2-CH_2-$ | O | $-CH_3$ | $-NH_2$ | $-NH-CH_3$ | $-OH$ | H | H | Greenish blue. |
| 230 | $K_2$ | 3 | $-O-CH_2-CH_2-$ | O | $-CH_3$ | $-NH-CH_3$ | $-NH-\langle H \rangle$ | $-OH$ | H | H | Do. |
| 231 | $K_4$ | 3 | $-O-CH_2-CH_2-$ | O | $-CH_3$ | $-NH-CH_3$ | $-NH-CH_3$ | $-OH$ | H | H | Do. |
| 232 | $K_{10}$ | 3 | $-O-CH_2-CH_2-$ | O | $-CH_3$ | $-NH-CH_3$ | $-NH-CH_3$ | $-OH$ | H | H | Do. |
| 233 | $K_{19}$ | 3 | $-O-CH_2-CH_2-$ | O | $-CH_3$ | $-NH-CH_3$ | $-NH-CH_3$ | $-OH$ | H | H | Do. |
| 234 | $K_1$ | 3 | $-O-CH_2-CH_2-$ | O | $-CH_3$ | $-NH_2$ | $-NH-\langle\rangle-OCH_3$ | $-OH$ | H | H | Do. |
| 235 | $K_{10}$ | 3 | $-O-CH_2-CH_2-$ | O | $n-C_6H_7$ | $-NH-CH_3$ | $-NH-\langle CH_3 \rangle-CH_3$ | $-OH$ | H | H | Do. |

EXAMPLE 236

The compound of the formula

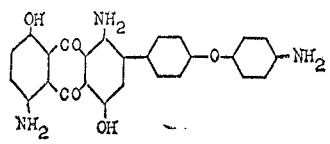

is prepared by reacting 21.5 parts of 1,5-diamino-4,8-dihydroxyanthraquinone-3,7-disulphonic acid and 14.5 parts of 4-aminophenyl-phenylether with subsequent cleavage of the $SO_3H$-group by the method described by J. Houben in "Das Anthracen und die Anthrachinone"; 1929, page 449. 22.7 parts of this compound are suspended in 227 parts of chlorobenzene at 70–80°. 4 parts of pyridine are added and then 6.2 parts of chloroacetylchloride are added dropwise at 70–80°. The mixture is stirred for 3 hours at 70–80° and evaporated to dryness under reduced pressure. The residue is dispersed in water and filtered.

The product is a compound of the formula

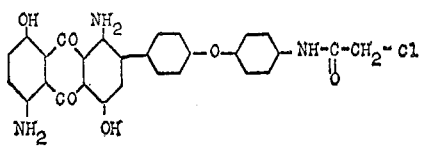

It is dissolved in 150 parts of dimethyl formamide at 80°, 6 parts of asymmetrical dimethylhydrazine are added and the mixture is then stirred for 12 hours at 60°. 300 parts of chlorobenzene are dropped in, on which the dye of the formula

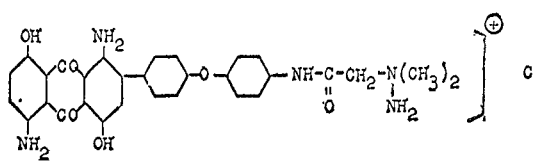

settles out. It is filtered off, washed with toluene and dried at 60° with vacuum. It is obtained as a blue-violet powder which dyes polyacrylonitrile fibres in bright blue shades.

EXAMPLE 237

A compound of the formula

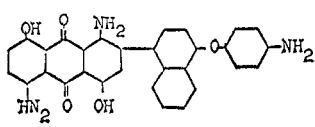

(prepared with 1,5-diamino-4,8-dihydroxyanthraquinone-3,7-disulphonic acid and 4-aminophenyl-naphthylether) is used in an amount equivalent to the amount used in Example 236 on which a dye with similarly good properties is obtained. It has the formula

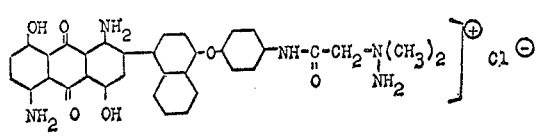

The structural composition of further dyes is listed in the following Table IV. They can be produced by the procedures of Examples 236 and 237 and correspond to the formula

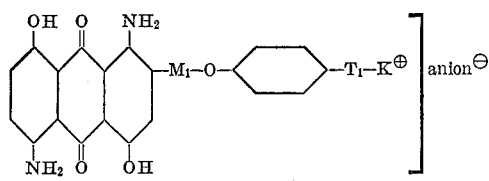

where $M_1$ represents a radical of one of the formulae

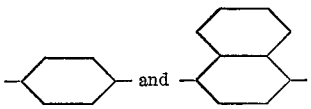

and $T_1$ and $K^\oplus$ have the meanings given in the table. The anion$^\ominus$ can be any one of those named in the description. The significance of $K^\oplus$ can be taken from Table A.

TABLE IV

| Example Number | $T_1$ | $K^\oplus$ | Shade of dyeing on acrylic fibre |
|---|---|---|---|
| 238 | —NH—CO—CH$_2$— | $K_1$ | Blue. |
| 239 | —NH—CO—CH$_2$— | $K_2$ | Do. |
| 240 | —NH—CO—CH$_2$— | $K_3$ | Do. |
| 241 | —NH—CO—CH$_2$— | $K_{10}$ | Do. |
| 242 | —NH—CO—CH$_2$— | $K_{11}$ | Do. |
| 243 | —NH—CO—CH$_2$— | $K_{12}$ | Do. |
| 244 | —NH—CO—CH$_2$— | $K_{13}$ | Do. |
| 245 | —NH—CO—CH$_2$— | $K_{17}$ | Do. |
| 246 | —NH—CO—CH$_2$— | $K_{18}$ | Do. |
| 247 | —NH—CO—CH$_2$— | $K_9$ | Do. |
| 248 | —NH—CO—CH$_2$— | $K_{19}$ | Do. |
| 249 | —CH$_2$— | $K_1$ | Do. |
| 250 | —CH$_2$— | $K_2$ | Do. |
| 251 | —CH$_2$— | $K_3$ | Do. |
| 252 | —CH$_2$— | $K_{10}$ | Do. |
| 253 | —CH$_2$— | $K_{11}$ | Do. |
| 254 | —CH$_2$— | $K_{12}$ | Do. |
| 255 | —CH$_2$— | $K_{13}$ | Do. |
| 256 | —CH$_2$— | $K_{17}$ | Do. |
| 257 | —CH$_2$— | $K_{18}$ | Do. |
| 258 | —CH$_2$— | $K_9$ | Do. |
| 259 | —CH$_2$— | $K_{19}$ | Do. |

Example 260

5.6 parts of the compound obtained as given in Example 5 are dissolved in 56 parts of glacial acetic at 30°. At this temperature 5.9 parts of propylene oxide are dropped in and the mixture is stirred at 30° until a thin layer chromatogram indicates that the starting material has completely reacted. The solution is concentrated with vacuum, upon which the dye of formula

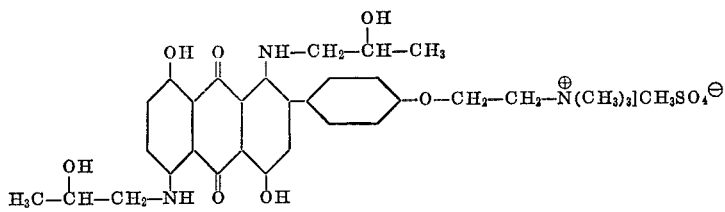

settles out in crystalline form. It is filtered off, washed with petroleum ether and dried. It is obtained as a blue powder which dyes acrylic fibres in deep greenish blue shades with good fastness properties.

Example 261

The same dye is obtained when 4.3 parts of the starting compound used in Example 4 are dissolved in 43 parts of glacial acid at 30°, 5.9 parts of propylene oxide dropped in at this temperature and the reaction mixture stirred at 30° until a thin layer chromatogram shows that all the starting material has reacted. 215 parts of water are added and the mixture made weakly alkaline, upon which a filterable precipitate settles out. The isolated product is washed until neutral and dried. It is a blue powder which has the formula

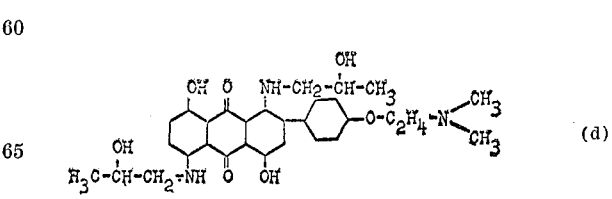

(d)

This dye gives a fast greenish blue dyeing on acrylic fibres. When the dye of Formula d is dissolved in chlorobenzene at 80°, an equivalent amount of dimethylsulphate added and the mixture stirred for 12 hours at 80°, a dye is obtained which is identical with that of Example 260.

Example 216(a)

A mixture of 4.3 parts of the compound obtained as given in Example 4, 4 parts of potassium acetate and 18.7 parts of 1-bromo-4-methoxybenzene is held at 165° for 4 hours. On cooling, 160 parts of methanol are added, upon which the dye of the formula

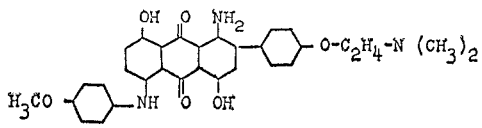

settles out. It can be recrystallized from dimethyl formamide. It gives bright greenish blue dyeings on acrylic fibres.

Example 261(b)

The dye obtained as described in Example 261(a) can be converted into the dye of the formula

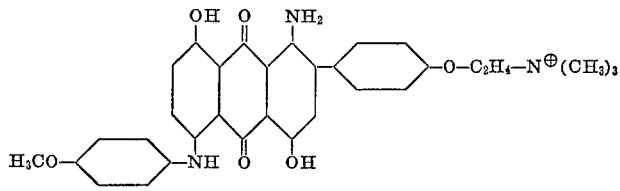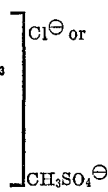

according to the procedures, of Example 5 or 6.

Example 261(c)

The same dye as in Example 261(b) is obtained when the dye produced as given in Example 5 is reacted with 1-bromo-4-methoxybenzene.

Dyeing Example A.—20 parts of the dye of the formula

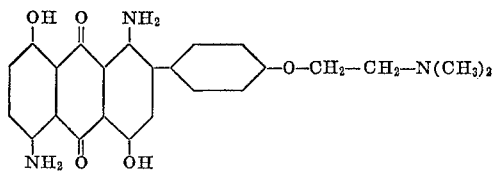

produced as given in Example 4 are mixed with 80 parts of dextrin in a ball mill for 48 hours. One part of the resulting preparation is pasted with 1 part of 40% acetic acid solution, and 400 parts of distilled water are run onto the paste with stirring, followed by boiling for a short time. The dye solution is added to 7000 parts of distilled water, with the subsequent addition of 2 parts of glacial acetic acid.

100 parts of a fabric of acrylic fibre, previously treated for 10–15 minutes at 60° in a bath of 8000 parts of water and 2 parts of glacial acetic acid, are entered into the dyebath at 60°. The bath is raised to 100° in 20 minutes and held at this temperature for 1 hour. On removal the fabric is rinsed and dried. A fast, deep dyeing of bright blue shade is obtained which has good light and wet fastness.

The dyes listed in Table V below can be dyed by the method of dyeing example. They have the formula

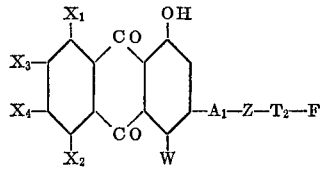

where $X_1$ to $X_4$, $A_1$, $T_2$, W, Z and F have the meanings given them in Table V. The symbol F can have any of the meanings given in Table B in columns — and —.

TABLE V

| Ex. No. | $A_1$ | Z | $T_2$ | F | $X_1$ | $X_2$ | $X_3$ | $X_4$ | W | Shade of dyeing on acrylic fibre |
|---|---|---|---|---|---|---|---|---|---|---|
| 262 | ⌬ | O | ⌬—NH—C(=O)—CH$_2$— | $F_1$ | —NH$_2$ | OH | H | H | —NH$_2$ | Blue. |
| 263 | Same | O | —C$_2$H$_4$—O—C(=O)—CH$_2$— | $F_1$ | —NH$_2$ | OH | H | H | —NH$_2$ | Do. |
| 264 | do | O | —C$_6$H$_{12}$— | $F_1$ | —NH$_2$ | OH | H | H | —NH$_2$ | Do. |
| 265 | ⌬ | O | —CH$_2$—CH(CH$_3$)— | $F_1$ | —NH$_2$ | OH | H | H | —NH$_2$ | Do. |
| 266 | Same | O | —CH$_2$—CH(CH$_3$)— | $F_2$ | —NH$_2$ | OH | H | H | —NH$_2$ | Do. |
| 267 | ⌬ | O | —C$_2$H$_4$— | $F_1$ | —NH$_2$ | OH | H | Br | —NH$_2$ | Do. |
| 268 | Same | O | —C$_2$H$_4$— | $F_1$ | —NH$_2$ | OH | H | Cl | —NH$_2$ | Do. |
| 269 | do | O | —C$_2$H$_4$— | $F_1$ | OH | OH | H | H | —NH$_2$ | Violet. |
| 270 | do | O | —C$_2$H$_4$— | $F_1$ | NO$_2$ | OH | H | H | —NO$_2$ | Orange. |
| 271 | do | O | —C$_2$H$_4$— | $F_1$ | —NH—CH$_3$ | OH | H | H | —NH—CH$_3$ | Greenish blue. |
| 272 | do | S | —C$_2$H$_4$— | $F_1$ | —NH$_2$ | OH | H | H | —NH$_2$ | Blue. |
| 273 | ⌬⌬ | O | —C$_2$H$_4$— | $F_1$ | —NH$_2$ | OH | H | H | —NH$_2$ | Do. |

The dyes listed in the following Table VI can be produced by the procedure of Example 4, with the difference that sulphuric acid of 70–80% strength instead of 90% strength is used when further substituted phenylethers are employed, e.g.

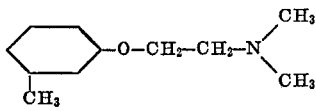

These dyes also can be dyed by the procedure given in Dyeing Example A.

The dyes have the formula

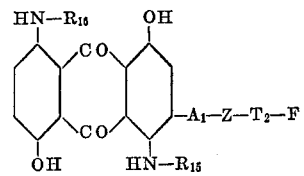

where $A_1$, $Z$, $T_2$, $R_{15}$, $R_{16}$ and F have the meaning given in Table VI. The symbol F can have any of the meanings given in Table B in Col. 23.

TABLE VI

| Example Number | $A_1$ | Z | $T_2$ | F | $R_{15}$ | $R_{16}$ | Shade of dyeing on acrylic fibre |
|---|---|---|---|---|---|---|---|
| 274 | —⟨ ⟩— | O | —$C_2H_4$— | $F_2$ | H | H | Blue. |
| 275 | Same as above | O | —$C_2H_4$— | $F_3$ | H | H | Do. |
| 276 | do | O | —$C_2H_4$— | $F_4$ | H | H | Do. |
| 277 | do | O | —$C_2H_4$— | $F_5$ | H | H | Do. |
| 278 | do | O | —$C_2H_4$— | $F_6$ | H | H | Do. |
| 279 | do | O | —$C_2H_4$— | $F_7$ | H | H | Do. |
| 280 | do | O | —$C_2H_4$— | $F_8$ | H | H | Do. |
| 281 | do | O | —$C_2H_4$— | $F_9$ | H | H | Do. |
| 282 | do | O | —$C_2H_4$— | $F_{10}$ | H | H | Do. |
| 283 | do | O | —$C_2H_4$— | $F_{11}$ | H | H | Do. |
| 284 | do | O | —$C_2H_4$— | $F_{12}$ | H | H | Do. |
| 285 | do | O | —$C_2H_4$— | $F_{13}$ | H | H | Do. |
| 286 | —⟨ ⟩—$OCH_3$ | O | —$C_2H_4$— | $F_1$ | H | H | Do. |
| 288 | —⟨ ⟩— | S | —$C_2H_4$— | $F_1$ | H | H | Do. |
| 289 | Same as above | O | —$CH_2$—$CH(CH_3)$— | $F_1$ | H | H | Do. |
| 290 | do | O | —$C_2H_4$—O—$C_2H_4$— | $F_1$ | H | H | Do. |
| 291 | —⟨ ⟩⟨ ⟩— (naphthyl) | O | —$C_2H_4$— | $F_1$ | H | H | Do. |
| 292 | Same as above | O | —$CH_2$—$CH(CH_3)$— | $F_1$ | H | H | Do. |
| 293 | —⟨ ⟩—Cl | O | —$C_2H_4$— | $F_1$ | H | H | Do. |
| 294 | —⟨ ⟩—Br | O | —$C_2H_4$— | $F_1$ | H | H | Do. |
| 295 | —⟨ ⟩—$OCH_3$ | O | —$C_2H_4$— | $F_1$ | H | H | Do. |
| 296 | —⟨ ⟩—Cl | O | —$C_2H_4$— | $F_1$ | H | H | Do. |
| 297 | —⟨ ⟩— | O | —$C_2H_4$— | $F_1$ | $CH_3$ | $CH_3$ | Greenish blue. |

Formulae of representative dyes of the foregoing examples are as follows:

Example 1

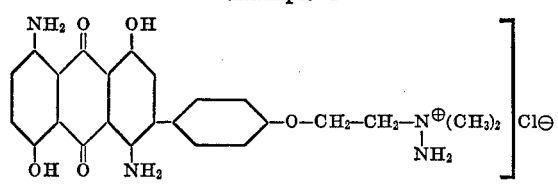

Example 2

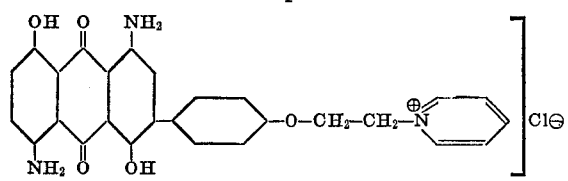

Example 3

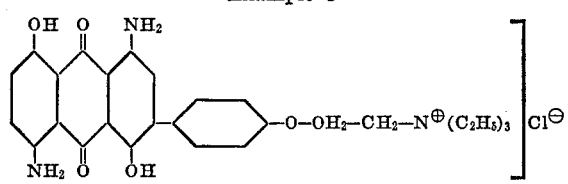

Example 4

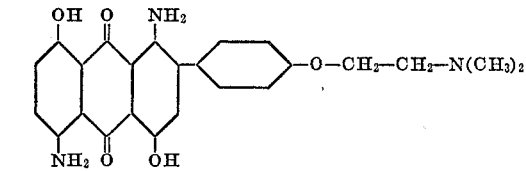

Example 5

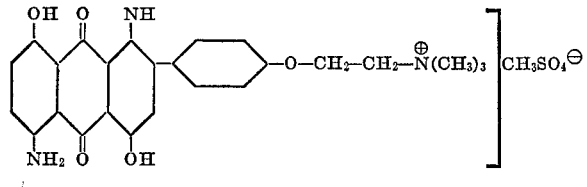

Example 47

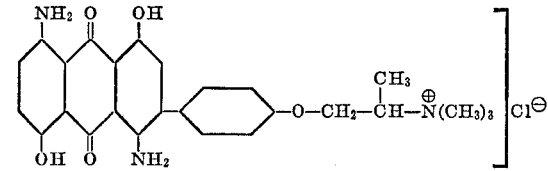

Example 51

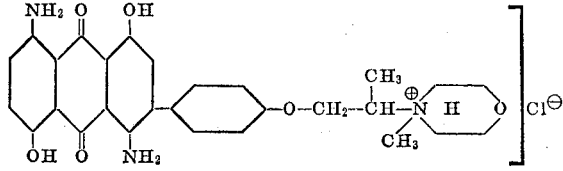

Example 171

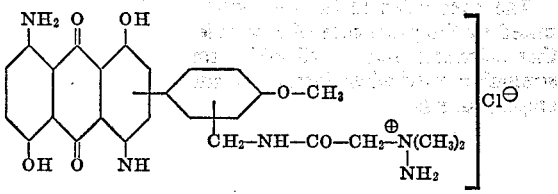

Example 183

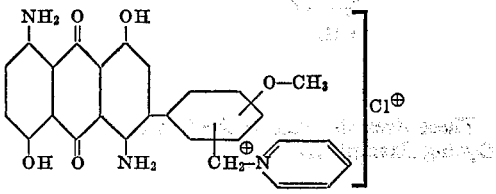

Example 236

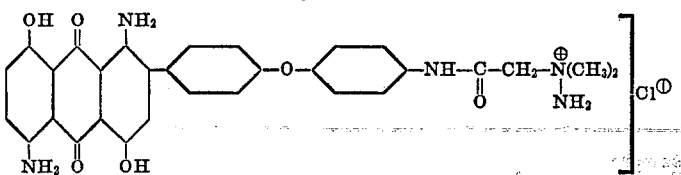

Having thus disclosed the invention, what I claim is:

1. Basic anthraquinone dye free from sulphonic acid groups and of the formula

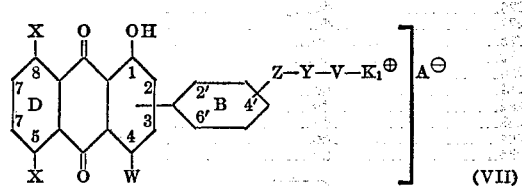

wherein
W is a member selected from the group consisting of nitro and —NH—R;
R is a member selected from the group consisting of hydrogen, a hydrocarbon radical and a substituted hydrocarbon radical; the hydrocarbon radical being alkyl having from 1 to 12 carbon atoms, cyclohexyl, methylcyclohexyl, aryl or aralkyl; the aryl of each aryl and each aralkyl being phenyl or naphthyl; any substituent on a substituted alkyl being hydroxy, halo or cyano; any substituent on a substituted aryl being hydroxy, halo, cyano, alkyl or alkoxy; and the alkyl of each alkyl and each alkoxy, unless otherwise specified, having from 1 to 6 carbon atoms;
one X is a member selected from the group consisting of hydroxy, nitro and —NH—R;
the other X is a member selected from the group consisting of hydroxy and —NH—R;
$A^\ominus$ is an anion equivalent to the dye cation;
Z is —O— or —S—;
Y is a direct linkage or phenylene bound to V directly;
V is alkylene having from 1 to 12 carbon atoms;
$K_1$ is a group of one of the formulae

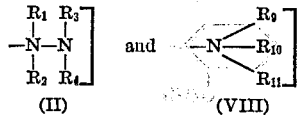

each of $R_1$ and $R_2$ is, independently, a substituted or unsubstituted member selected from the group consisting of alkyl, phenalkyl and cyclohexyl; each alkyl having from 1 to 6 carbon atoms; and any substituent of a substituted member being selected from the group consisting of hydroxy, halo and cyano;

each of $R_3$ and $R_4$ is, independently, hydrogen or a substituted or unsubstituted member selected from the group consisting of alkyl, phenalkyl and cyclohexyl; any substituent of a substituted member being hydroxy, halo or cyano; and each alkyl having from 1 to 6 carbon atoms;

each of $R_9$, $R_{10}$ and $R_{11}$ is, independently, a substituted or unsubstituted member selected from the group consisting of alkyl, phenalkyl and cyclohexyl; any substituent of a substituted member being hydroxy, halo or cyano; and each alkyl having from 1 to 6 carbon atoms;

each of ring B and ring D is, independently, further unsubstituted or further substituted by a member selected from the group consisting of halo, hydroxy, lower alkyl, lower alkoxy, hydrophenyl and alkoxyphenyl; the alkyl of the alkoxyphenyl having from 1 to 6 carbon atoms; and Z is one of the positions 2' and 4'.

2. Basic anthraquinone dye according to claim 1 wherein $K_1$ is a group of Formula VIII.

3. Basic anthraquinone dye according to claim 1 wherein $K_1$ is a group of Formula II.

4. The basic dye according to claim 1 of the formula

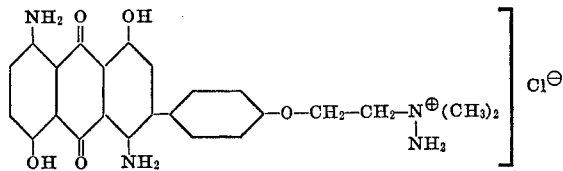

5. The basic dye according to claim 1 of the formula

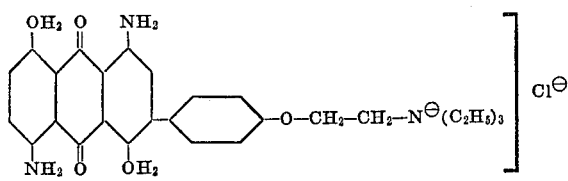

6. The basic dye according to claim 1 of the formula

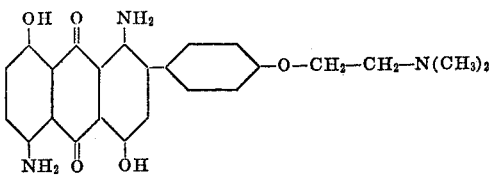

7. The basic dye according to claim 1 of the formula

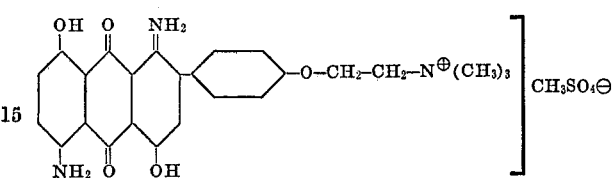

8. The basic dye according to claim 1 of the formula

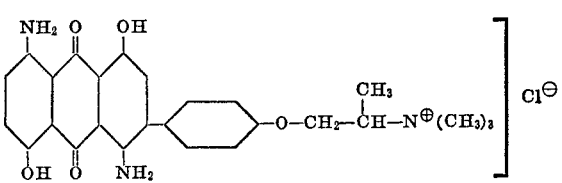

References Cited

FOREIGN PATENTS 603,298   8/1960   Canada _____ 260—380

LORRAINE A. WEINBERGER, Primary Examiner

R. GERSTL, Assistant Examiner

U.S. Cl. X.R.

8—39; 260—239 EQ, 244 B, 247.1, 247.2 A, 247.2 B, 247.5 R, 249, 262, 272, 312, 326.3, 326.5 S 326.5 SF, 326.5 C, 372, 373, 376, 377, 379